US008694319B2

(12) United States Patent
Bodin et al.

(10) Patent No.: US 8,694,319 B2

(45) Date of Patent: Apr. 8, 2014

(54) DYNAMIC PROSODY ADJUSTMENT FOR VOICE-RENDERING SYNTHESIZED DATA

(75) Inventors: William K. Bodin, Austin, TX (US); David Jaramillo, Lake Worth, FL (US); Jerry W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1753 days.

(21) Appl. No.: 11/266,559

(22) Filed: Nov. 3, 2005

(65) Prior Publication Data

US 2007/0100628 A1 May 3, 2007

(51) Int. Cl.

| | |
|---|---|
| ***G10L 13/00*** | (2006.01) |
| ***G10L 13/08*** | (2013.01) |
| ***G10L 15/26*** | (2006.01) |
| ***G10L 15/06*** | (2013.01) |
| ***G10L 17/00*** | (2013.01) |
| ***G10L 21/00*** | (2013.01) |

(52) U.S. Cl.

USPC ........... 704/258; 704/260; 704/261; 704/235; 704/243; 704/246; 704/275; 704/270; 704/270.1; 704/277

(58) Field of Classification Search

USPC ......... 704/258, 260, 261, 235, 243, 275, 270, 704/270.1, 277; 725/34

See application file for complete search history.

(56) References Cited

U.S. PATENT DOCUMENTS

| | | | | |
|---|---|---|---|---|
| 4,785,408 A | | 11/1988 | Britton et al. | |
| 5,341,469 A | | 8/1994 | Rossberg et al. | |
| 5,377,354 A | | 12/1994 | Scannell et al. | |
| 5,564,043 A | | 10/1996 | Siefert | |
| 5,566,291 A | * | 10/1996 | Boulton et al. | 715/709 |
| 5,613,032 A | * | 3/1997 | Cruz et al. | 386/241 |
| 5,715,370 A | | 2/1998 | Luther et al. | |
| 5,732,216 A | | 3/1998 | Logan | |
| 5,774,131 A | | 6/1998 | Kim | |
| 5,819,220 A | | 10/1998 | Sarukkai | |
| 5,884,266 A | | 3/1999 | Dvorak | |
| 5,890,117 A | * | 3/1999 | Silverman | 704/260 |
| 5,892,825 A | | 4/1999 | Mages | |

(Continued)

FOREIGN PATENT DOCUMENTS

| | | |
|---|---|---|
| CN | 1123075 A | 5/1996 |
| CN | 1298173 | 6/2001 |

(Continued)

OTHER PUBLICATIONS

Lu et al., "Audio Ticker". WWW7 / Computer Networks 30(1-7): 721-722 (1998).*

(Continued)

*Primary Examiner* — Edgar Guerra-Erazo

(74) *Attorney, Agent, or Firm* — Brevetto Law Group

(57) ABSTRACT

Methods, systems, and products are disclosed for dynamic prosody adjustment for voice-rendering synthesized data that include retrieving synthesized data to be voice-rendered; identifying, for the synthesized data to be voice-rendered, a particular prosody setting; determining, in dependence upon the synthesized data to be voice-rendered and the context information for the context in which the synthesized data is to be voice-rendered, a section of the synthesized data to be rendered; and rendering the section of the synthesized data in dependence upon the identified particular prosody setting.

21 Claims, 18 Drawing Sheets

(56) References Cited

U.S. PATENT DOCUMENTS 5,901,287 A 5/1999 Bull
5,903,727 A 5/1999 Nielsen
5,911,776 A 6/1999 Guck
5,978,463 A 11/1999 Jurkevics et al.
6,006,187 A * 12/1999 Tanenblatt .................... 704/260
6,012,098 A 1/2000 Bayeh et al.
6,029,135 A 2/2000 Krasle
6,032,260 A 2/2000 Sasmazel
6,044,347 A 3/2000 Abella et al.
6,055,525 A 4/2000 Nusbickel
6,064,961 A * 5/2000 Hanson ......................... 704/260
6,088,026 A 7/2000 Williams
6,092,121 A 7/2000 Bennett et al.
6,115,482 A * 9/2000 Sears et al. .................... 382/114
6,115,686 A 9/2000 Chung et al.
6,141,693 A 10/2000 Perlman
6,178,511 B1 1/2001 Cohen
6,199,076 B1 3/2001 Logan et al.
6,233,318 B1 5/2001 Picard et al.
6,240,391 B1 5/2001 Ball
6,266,649 B1 7/2001 Linden
6,272,461 B1 * 8/2001 Meredith et al. .............. 704/235
6,282,511 B1 8/2001 Mayer
6,282,512 B1 8/2001 Hemphill
6,311,194 B1 10/2001 Sheth
6,317,714 B1 11/2001 Del Castillo et al.
6,324,511 B1 * 11/2001 Kiraly et al. .................. 704/260
6,397,185 B1 * 5/2002 Komissarchik et al. ...... 704/270
6,463,440 B1 10/2002 Hind
6,468,084 B1 * 10/2002 MacMillan ................... 434/185
6,480,860 B1 11/2002 Monday
6,510,413 B1 * 1/2003 Walker .......................... 704/258
6,519,617 B1 2/2003 Wanderski
6,532,477 B1 3/2003 Tang
6,563,770 B1 5/2003 Kokhab
6,568,939 B1 * 5/2003 Edgar ........................... 434/179
6,574,599 B1 6/2003 Lim et al.
6,593,943 B1 7/2003 MacPhail
6,594,637 B1 7/2003 Furukawa et al.
6,604,076 B1 8/2003 Holley et al.
6,611,876 B1 8/2003 Barrett et al.
6,644,973 B2 * 11/2003 Oster ............................ 434/178
6,684,370 B1 1/2004 Sikorsky et al.
6,687,678 B1 2/2004 Yorimatsu et al.
6,728,680 B1 * 4/2004 Aaron et al. .................. 704/271
6,731,993 B1 5/2004 Carter et al.
6,771,743 B1 8/2004 Butler
6,792,407 B2 * 9/2004 Kibre et al. ................... 704/260
6,802,041 B1 10/2004 Rehm
6,810,146 B2 * 10/2004 Loui et al. ..................... 382/173
6,832,196 B2 12/2004 Reich
6,839,669 B1 1/2005 Gould
6,859,527 B1 2/2005 Banks et al.
6,901,403 B1 5/2005 Bata et al.
6,912,691 B1 6/2005 Dodrill
6,931,587 B1 * 8/2005 Krause .......................... 715/205
6,944,214 B1 9/2005 Gilbert
6,944,591 B1 9/2005 Raghunandan
6,965,569 B1 11/2005 Carolan
6,976,082 B1 12/2005 Ostermann
6,990,451 B2 * 1/2006 Case et al. .................... 704/260
6,992,451 B2 1/2006 Kamio et al.
6,993,476 B1 1/2006 Dutta
7,017,120 B2 3/2006 Shnier
7,031,477 B1 4/2006 Melia et al.
7,039,643 B2 5/2006 Sena
7,046,772 B1 5/2006 Moore
7,054,818 B2 5/2006 Sharma et al.
7,062,437 B2 * 6/2006 Kovales et al. ............... 704/260
7,065,222 B2 6/2006 Wilcock
7,069,092 B2 6/2006 Wiser et al.
7,096,183 B2 * 8/2006 Junqua .......................... 704/258
7,107,281 B2 9/2006 De La Huerga
7,113,909 B2 * 9/2006 Nukaga et al. ................ 704/258
7,120,702 B2 10/2006 Huang
7,130,850 B2 10/2006 Russell-Falla
7,139,713 B2 11/2006 Falcon
7,149,694 B1 12/2006 Harb et al.
7,149,810 B1 12/2006 Miller et al.
7,162,502 B2 1/2007 Suarez et al.
7,171,411 B1 1/2007 Lewis
7,178,100 B2 2/2007 Call
7,191,133 B1 * 3/2007 Pettay ........................... 704/270
7,313,528 B1 12/2007 Miller
7,346,649 B1 3/2008 Wong
7,349,949 B1 3/2008 Connor et al.
7,356,470 B2 4/2008 Roth
7,366,712 B2 4/2008 He
7,369,988 B1 5/2008 Thenthiruperal et al.
7,386,575 B2 6/2008 Bashant et al.
7,392,102 B2 6/2008 Sullivan et al.
7,430,510 B1 9/2008 De Fabbrizio et al.
7,433,819 B2 * 10/2008 Adams et al. ................. 704/251
7,437,408 B2 10/2008 Schwartz
7,454,346 B1 11/2008 Dodrill
7,505,978 B2 3/2009 Bodin et al.
7,542,903 B2 * 6/2009 Azara et al. ................... 704/257
7,552,055 B2 * 6/2009 Lecoeuche ................. 704/270.1
7,561,932 B1 7/2009 Holmes et al.
7,568,213 B2 7/2009 Carhart et al.
7,657,006 B2 2/2010 Woodring
7,664,641 B1 * 2/2010 Pettay et al. .................. 704/251
7,685,525 B2 3/2010 Kumar
7,729,478 B1 * 6/2010 Coughlan et al. .......... 379/88.04
7,873,520 B2 * 1/2011 Paik .............................. 704/258
7,890,517 B2 2/2011 Angelo
7,949,681 B2 5/2011 Bodin
7,996,754 B2 8/2011 Bodin et al.
2001/0014146 A1 8/2001 Beyda et al.
2001/0027396 A1 10/2001 Sato
2001/0040900 A1 11/2001 Salmi
2001/0049725 A1 12/2001 Kosuge
2001/0054074 A1 12/2001 Hayashi
2002/0013708 A1 1/2002 Walker
2002/0015480 A1 2/2002 Daswani et al.
2002/0032564 A1 3/2002 Ehsani
2002/0032776 A1 3/2002 Hasegawa
2002/0039426 A1 4/2002 Takemoto et al.
2002/0057678 A1 5/2002 Jiang et al.
2002/0062216 A1 5/2002 Guenther
2002/0083013 A1 6/2002 Rollins
2002/0095292 A1 7/2002 Mittal
2002/0120451 A1 * 8/2002 Kato et al. .................... 704/258
2002/0120693 A1 8/2002 Rudd et al.
2002/0128837 A1 9/2002 Morin
2002/0130891 A1 * 9/2002 Singer ........................... 345/684
2002/0143414 A1 10/2002 Wilcock
2002/0151998 A1 10/2002 Kemppi et al.
2002/0152210 A1 10/2002 Johnson
2002/0169770 A1 11/2002 Kim et al.
2002/0173964 A1 11/2002 Reich
2002/0178007 A1 11/2002 Slotznick
2002/0193894 A1 12/2002 Terada et al.
2002/0194286 A1 12/2002 Matsuura
2002/0194480 A1 12/2002 Nagao
2002/0198714 A1 12/2002 Zhou
2002/0198720 A1 12/2002 Takagi
2003/0013073 A1 * 1/2003 Duncan et al. ................ 434/317
2003/0018727 A1 1/2003 Yamamoto
2003/0028380 A1 * 2/2003 Freeland et al. .............. 704/260
2003/0033331 A1 2/2003 Sena
2003/0055835 A1 3/2003 Roth
2003/0055868 A1 3/2003 Fletcher
2003/0078780 A1 * 4/2003 Kochanski et al. ........... 704/258
2003/0103606 A1 6/2003 Rhie
2003/0108184 A1 6/2003 Brown et al.
2003/0110185 A1 6/2003 Rhoads
2003/0110272 A1 6/2003 du Castel
2003/0110297 A1 6/2003 Tabatabai
2003/0115056 A1 6/2003 Gusler
2003/0115064 A1 6/2003 Gusler
2003/0115289 A1 6/2003 Chinn et al.
2003/0126293 A1 7/2003 Bushey
2003/0132953 A1 7/2003 Johnson

(56) References Cited

U.S. PATENT DOCUMENTS

2003/0145062 A1 7/2003 Sharma et al.
2003/0151618 A1 8/2003 Johnson et al.
2003/0156130 A1 8/2003 James et al.
2003/0158737 A1 8/2003 Csicsatka
2003/0160770 A1 8/2003 Zimmerman
2003/0163211 A1 8/2003 Van Der Meulen
2003/0167234 A1 9/2003 Bodmer
2003/0172066 A1 9/2003 Cooper
2003/0182000 A1 9/2003 Muesch et al.
2003/0182124 A1 9/2003 Khan
2003/0187668 A1 10/2003 Ullmann et al.
2003/0187726 A1 10/2003 Bull et al.
2003/0188255 A1 10/2003 Shimizu
2003/0212654 A1 11/2003 Harper
2003/0225599 A1 12/2003 Mueller
2003/0229847 A1 12/2003 Kim
2004/0003394 A1 1/2004 Ramaswamy
2004/0034653 A1 2/2004 Maynor
2004/0041835 A1 3/2004 Lu
2004/0044665 A1 3/2004 Nwabueze
2004/0049477 A1 3/2004 Powers et al.
2004/0067472 A1* 4/2004 Polanyi et al. ................ 434/178
2004/0068552 A1 4/2004 Kotz
2004/0088063 A1 5/2004 Hoshi et al.
2004/0088349 A1 5/2004 Beck
2004/0093350 A1 5/2004 Alexander et al.
2004/0107125 A1 6/2004 Guheen
2004/0120479 A1 6/2004 Creamer et al.
2004/0128276 A1 7/2004 Scanlon et al.
2004/0143430 A1* 7/2004 Said et al. ......................... 704/2
2004/0153178 A1 8/2004 Koch et al.
2004/0172254 A1 9/2004 Sharma et al.
2004/0199375 A1 10/2004 Ehsani
2004/0201609 A1 10/2004 Obrador
2004/0210626 A1 10/2004 Bodin et al.
2004/0225499 A1* 11/2004 Wang et al. ................... 704/257
2004/0254851 A1 12/2004 Himeno
2004/0267387 A1 12/2004 Samadani
2004/0267774 A1 12/2004 Lin et al.
2005/0004992 A1 1/2005 Horstmann
2005/0015254 A1 1/2005 Beaman
2005/0015718 A1 1/2005 Sambhus et al.
2005/0021826 A1 1/2005 Kumar
2005/0043940 A1 2/2005 Elder
2005/0045373 A1 3/2005 Born
2005/0065625 A1 3/2005 Sass
2005/0071780 A1 3/2005 Muller
2005/0076365 A1 4/2005 Popov
2005/0088981 A1* 4/2005 Woodruff et al. ............. 370/260
2005/0108521 A1 5/2005 Silhavy
2005/0114139 A1 5/2005 Dincer
2005/0119894 A1* 6/2005 Cutler et al. .................. 704/270
2005/0120083 A1 6/2005 Aizawa et al.
2005/0137875 A1 6/2005 Kim et al.
2005/0138063 A1 6/2005 Bazot et al.
2005/0144002 A1 6/2005 Ps
2005/0144022 A1 6/2005 Evans
2005/0152344 A1 7/2005 Chiu et al.
2005/0154580 A1 7/2005 Horowitz
2005/0154969 A1 7/2005 Bodin et al.
2005/0190897 A1 9/2005 Eberle et al.
2005/0195999 A1 9/2005 Takemura et al.
2005/0203887 A1 9/2005 Joshi et al.
2005/0203959 A1 9/2005 Muller
2005/0203960 A1 9/2005 Suarez et al.
2005/0232242 A1 10/2005 Karaoguz
2005/0234727 A1 10/2005 Chiu
2005/0251513 A1 11/2005 Tenazas
2005/0261905 A1* 11/2005 Pyo et al. ...................... 704/252
2005/0262119 A1 11/2005 Mawdsley
2005/0286705 A1* 12/2005 Contolini et al. ........ 379/265.02
2005/0288926 A1 12/2005 Benco
2006/0008252 A1 1/2006 Kim
2006/0008258 A1 1/2006 Kawana
2006/0020662 A1 1/2006 Robinson
2006/0031447 A1 2/2006 Holt
2006/0041549 A1 2/2006 Gundersen et al.
2006/0048212 A1 3/2006 Tsuruoka
2006/0050794 A1 3/2006 Tan
2006/0050996 A1* 3/2006 King et al. .................... 382/312
2006/0052089 A1 3/2006 Khurana et al.
2006/0075224 A1 4/2006 Tao
2006/0085199 A1 4/2006 Jain
2006/0095848 A1 5/2006 Naik
2006/0100877 A1* 5/2006 Zhang et al. .................. 704/260
2006/0112844 A1 6/2006 Hiller
2006/0114987 A1 6/2006 Roman
2006/0123082 A1 6/2006 Kopikis
2006/0129403 A1* 6/2006 Liao et al. ..................... 704/260
2006/0136449 A1 6/2006 Parker
2006/0140360 A1 6/2006 Crago
2006/0149781 A1 7/2006 Blankinship
2006/0155698 A1 7/2006 Vayssiere
2006/0159109 A1 7/2006 Lamkin
2006/0165104 A1 7/2006 Kaye
2006/0168507 A1 7/2006 Hansen
2006/0173985 A1 8/2006 Moore
2006/0184679 A1 8/2006 Izdepski
2006/0190616 A1 8/2006 Mayerhofer
2006/0193450 A1 8/2006 Flynt
2006/0200743 A1 9/2006 Thong et al.
2006/0206533 A1 9/2006 MacLaurin
2006/0224739 A1 10/2006 Anantha
2006/0233327 A1 10/2006 Roberts
2006/0242663 A1* 10/2006 Gogerty .......................... 725/34
2006/0253699 A1 11/2006 Della-Libera
2006/0265503 A1 11/2006 Jones et al.
2006/0282317 A1 12/2006 Rosenberg
2006/0282822 A1 12/2006 Weng
2006/0287745 A1 12/2006 Richenstein et al.
2006/0288011 A1 12/2006 Gandhi
2007/0005339 A1* 1/2007 Jaquinta ............................ 704/8
2007/0027692 A1 2/2007 Sharma et al.
2007/0027859 A1 2/2007 Harney et al.
2007/0027958 A1 2/2007 Haslam
2007/0043735 A1 2/2007 Bodin et al.
2007/0043758 A1 2/2007 Bodin et al.
2007/0043759 A1 2/2007 Bodin et al.
2077/0043462 2/2007 Terada et al.
2007/0061132 A1 3/2007 Bodin
2007/0061229 A1 3/2007 Ramer
2007/0061266 A1 3/2007 Moore
2007/0061371 A1 3/2007 Bodin et al.
2007/0061401 A1 3/2007 Bodin et al.
2007/0061711 A1 3/2007 Bodin
2007/0061712 A1 3/2007 Bodin
2007/0073728 A1 3/2007 Klein, Jr.
2007/0077921 A1 4/2007 Hayashi
2007/0078655 A1 4/2007 Semkow
2007/0083540 A1 4/2007 Gundla
2007/0091206 A1 4/2007 Bloebaum
2007/0100626 A1 5/2007 Miller et al.
2007/0100629 A1 5/2007 Bodin et al.
2007/0100787 A1 5/2007 Lim et al.
2007/0100836 A1 5/2007 Eichstaedt et al.
2007/0101274 A1 5/2007 Kurlander
2007/0101313 A1 5/2007 Bodin et al.
2007/0112844 A1 5/2007 Tribble
2007/0118426 A1 5/2007 Barnes, Jr.
2007/0124458 A1 5/2007 Kumar
2007/0124802 A1 5/2007 Anton, Jr.
2007/0130589 A1 6/2007 Davis
2007/0138999 A1 6/2007 Lee et al.
2007/0147274 A1 6/2007 Vasa
2007/0165538 A1 7/2007 Bodin
2007/0168191 A1 7/2007 Bodin et al.
2007/0168194 A1 7/2007 Bodin et al.
2007/0174326 A1 7/2007 Schwartz
2007/0191008 A1 8/2007 Bucher
2007/0192327 A1 8/2007 Bodin
2007/0192672 A1 8/2007 Bodin
2007/0192673 A1 8/2007 Bodin
2007/0192674 A1 8/2007 Bodin
2007/0192675 A1 8/2007 Bodin et al.

(56) References Cited

U.S. PATENT DOCUMENTS

| | | | |
|---|---|---|---|
| 2007/0192676 | A1 | 8/2007 | Bodin |
| 2007/0192683 | A1 | 8/2007 | Bodin |
| 2007/0192684 | A1 | 8/2007 | Bodin |
| 2007/0198267 | A1 | 8/2007 | Jones et al. |
| 2007/0208687 | A1 | 9/2007 | O'Conor |
| 2007/0213857 | A1 | 9/2007 | Bodin |
| 2007/0213986 | A1 | 9/2007 | Bodin |
| 2007/0214147 | A1 | 9/2007 | Bodin |
| 2007/0214148 | A1 | 9/2007 | Bodin |
| 2007/0214149 | A1 | 9/2007 | Bodin |
| 2007/0214485 | A1 | 9/2007 | Bodin |
| 2007/0220024 | A1 | 9/2007 | Putterman |
| 2007/0239837 | A1 | 10/2007 | Jablokov |
| 2007/0253699 | A1 | 11/2007 | Yen |
| 2007/0276837 | A1 | 11/2007 | Bodin |
| 2007/0276865 | A1 | 11/2007 | Bodin |
| 2007/0276866 | A1 | 11/2007 | Bodin |
| 2007/0277088 | A1 | 11/2007 | Bodin |
| 2007/0277233 | A1 | 11/2007 | Bodin |
| 2008/0034278 | A1 | 2/2008 | Tsou |
| 2008/0052415 | A1 | 2/2008 | Kellerman |
| 2008/0082576 | A1 | 4/2008 | Bodin |
| 2008/0082635 | A1 | 4/2008 | Bodin |
| 2008/0155616 | A1 | 6/2008 | Logan et al. |
| 2008/0161948 | A1 | 7/2008 | Bodin |
| 2008/0162131 | A1 | 7/2008 | Bodin |
| 2008/0162559 | A1 | 7/2008 | Bodin |
| 2008/0275893 | A1 | 11/2008 | Bodin |
| 2009/0271178 | A1 | 10/2009 | Bodin |

FOREIGN PATENT DOCUMENTS

| | | | |
|---|---|---|---|
| CN | 1368719 | C | 9/2002 |
| EP | 1197884 | | 1/2006 |
| GB | 2369955 | | 6/2002 |
| KR | 2001-0071517 | | 7/2001 |
| KR | 1020010071517 | A | 7/2001 |
| KR | 2004-0078888 | | 9/2004 |
| KR | 1020040078888 | A | 9/2004 |
| WO | WO 0182139 | | 11/2001 |
| WO | WO2005106846 | | 11/2005 |

OTHER PUBLICATIONS

IM SpeakEasy! from Eastbay Technologies, 2003, see website http://webarchive.org/web/20031203063919/http://eastbaytech.com/im.htm.*
U.S. Appl. No. 11/619,236 Final Office Action mailed Oct. 22, 2010.
U.S. Appl. No. 12/178,448 Office Action mailed Apr. 2, 2010.
U.S. Appl. No. 12/178,448 Final Office Action mailed Sep. 14, 2010.
Mohan et al. "Adapting Multimedia Internet Content for Universal Access." IBM T.J Watson Research Center, pp. 1-35.
http://webarchive.org/web/20031203063919/http://eastbaytech.com/im.htm.
http://www.odiogo.com.
FeedForAll at http://web.archive.org/web/20050813012521/http://www.feedforall.com/itune-tutorial-tags.htm.
Internet Archive for FeedForAll at http://web.archive.org/web/*/http://www.feedforall.com/itune-tuntorial-tags.htm.
Audioblog at http://web.archive.org/web/20040923235033.
Zhang, Liang-Jie, et al., "XML-Based Advanced UDDI Search Mechanism for B2B Integration", Electronic Commerce Research, vol. 3, Nos. 1-2, Jan. 2003, pp. 24-42.
He Tian, et al., "AIDA: Adaptive Application-Independent Data Aggregation in Wireless Sensor Networks", TECS, vol. 3, Issue 2, May 2004, pp. 426-457.
Braun N. Doner R: "Using Sonic Hyperlinks in Web-TV," International Conf on Auditory Displays (ICAD '98), Nov. 1, 1998, XPOO2428659, Glasgow, UK.
Braun N et al: "Temporal hypermedia for multimedia applications in the World Wide Web," Computational Intelligence and Multimedia Applications, 1999. ICCIMA '99. Third International Conference on New Delhi, India, Sep. 23-23, 1999. Los Alamitos, CA USE, IEEE Comput. SAC, US, Sep. 23, 1999, XP010355646 ISBN: 0-7695-0300-4.
Frankie James: "AHA: audio HTML access" Computer Networks and ISDN Systems, vol. 209, No. 8-13, Sep. 1997, pp. 1395-1404, XP002430654.
PCT Search Report, Sep. 2, 2007; PCT Application No. PCT/EP2007/051260.
Hoschka, et al.; "Synchronized Multimedia Integration Language (SMIL) 1.0 Specification"; Apr. 9, 1998; . doi: http://www.w3.org/TR/1998/PR-smil-19980409/#anchor.
Casalaina, et al.; "BMRC Procedures: RealMedia Guide"; doi: http://web.archive.org/web/20030218131051/http://bmrc.berkeley.edu/info/procedures/rm.html.
Barbara, et al.; "The Audio Web"; Proc. 6th Int. Conf. on Information and Knowledge Management; Jan. 1997; XP002352519; Las Vegas; USA; pp. 97-104.
Office Action Dated Jan. 25, 2010 in U.S. Appl. No. 11/207,912.
Notice of Allowance Dated Feb. 3, 2010 in U.S. Appl. No. 11/207,911.
Final Office Action Dated Jul. 31, 2009 in U.S. Appl. No. 11/226,746.
Office Action Dated Jan. 25, 2010 in U.S. Appl. No. 11/226,746.
Final Office Action Dated Nov. 5, 2009 in U.S. Appl. No. 11/352,709.
Office Action Dated Apr. 29, 2009 in U.S. Appl. No. 11/352,698.
Office Action Dated Aug. 17, 2009 in U.S. Appl. No. 11/331,692.
Office Action Dated Jun. 11, 2009 in U.S. Appl. No. 11/352,710.
Office Action Dated May 19, 2009 in U.S. Appl. No. 11/352,727.
Final Office Action Dated Apr. 20, 2009 in U.S. Appl. No. 11/266,559.
Final Office Action Dated Oct. 30, 2008 in U.S. Appl. No. 11/266,662.
Final Office Action Dated Apr. 6, 2009 in U.S. Appl. No. 11/266,675.
Final Office Action Dated Dec. 19, 2008 in U.S. Appl. No. 11/266,698.
Office Action Dated May 14, 2009 in U.S. Appl. No. 11/352,709.
Final Office Action Dated Apr. 29, 2008 in U.S. Appl. No. 11/207,911.
Final Office Action Dated Apr. 15, 2009 in U.S. Appl. No. 11/207,911.
Final Office Action Dated Sep. 25, 2008 in U.S. Appl. No. 11/226,747.
Final Office Action Dated May 7, 2008 in U.S. Appl. No. 11/226,744.
Final Office Action Dated May 7, 2008 in U.S. Appl. No. 11/207,912.
Final Office Action Dated Apr. 28, 2009 in U.S. Appl. No. 11/207,912.
Final Office Action Dated Sep. 16, 2008 in U.S. Appl. No. 11/266,663.
Final Office Action Dated Mar. 30, 2009 in U.S. Appl. No. 11/331,694.
Final Office Action Dated Feb. 9, 2009 in U.S. Appl. No. 11/331,692.
Final Office Action Dated May 7, 2008 in U.S. Appl. No. 11/207,914.
Final Office Action Dated Apr. 14, 2009 in U.S. Appl. No. 11/207,914.
Final Office Action Dated Dec. 23, 2008 in U.S. Appl. No. 11/207,913.
Final Office Action Dated Sep. 15, 2008 in U.S. Appl. No. 11/226,746.
Monahan et al.; "Adapting Multimedia Internet Content for Universal Access"; IEEE Transactions on Multimedia, vol. 1, No. 1; pp. 104-114; Mar. 1999.
Buchanan et al.; "Representing Aggregated Works in the Digital Library", University College London; London; pp. 247-256; Jun. 18, 2007.
Advertisement of TextToSpeechMP3.com; "Text to Speech MP3 with Natural Voices 1.71"; (author unknown); ZDNet.co.uk, London; from website http://downloadsszdnet.co.uk/0,1000000375,39148337s,00.htm; pp. 1-5; Oct. 5, 2004.
Andrade et al.; "Managing Multimedia Content and Delivering Services Across Multiple Client Platforms using XML"; Symposium; London Communications; London; pp. 1-8; Sep. 2002.
International Business Machines Corporation; PCT Search Report; Mar. 27, 2007; Application No. PCT/EP2007/050594.
U.S. Appl. No. 11/352,680 Office Action mailed Jun. 23, 2006.

(56) References Cited

OTHER PUBLICATIONS

U.S. Appl. No. 11/372,317 Office Action mailed Jul. 8, 2009.
U.S. Appl. No. 11/536,733 Final Office Action mailed Jul. 22, 2009.
U.S. Appl. No. 11/420,017 Office Action mailed Jul. 9, 2009.
U.S. Appl. No. 11/536,781 Office Action mailed Jul. 17, 2009.
U.S. Appl. No. 11/420,014 Office Action mailed Jul. 23, 2009.
U.S. Appl. No. 11/420,018 Final Office Action mailed Jul. 21, 2009.
U.S. Appl. No. 11/352,760 Office Action mailed Apr. 15, 2009.
U.S. Appl. No. 11/352,760 Final Office Action mailed Nov. 16, 2009.
U.S. Appl. No. 11/352,824 Notice of Allownace mailed Jun. 5, 2008.
U.S. Appl. No. 11/352,824 Office Action mailed Jan. 22, 2008.
U.S. Appl. No. 11/352,680 Final Office Action mailed Dec. 21, 2009.
U.S. Appl. No. 11/352,679 Office Action mailed Apr. 30, 2009.
U.S. Appl. No. 11/352,679 Final Office Action mailed Oct. 29, 2009.
U.S. Appl. No. 11/372,323 Office Action mailed Oct. 28, 2008.
U.S. Appl. No. 11/372,318 Office Action mailed Mar. 18, 2008.
U.S. Appl. No. 11/372,318 Final Office Action mailed Jul. 9, 2008.
U.S. Appl. No. 11/372,329 Final Office Action mailed Nov. 6, 2009.
U.S. Appl. No. 11/372,325 Office Action mailed Feb. 25, 2009.
U.S. Appl. No. 11/372,329 Office Action mailed Feb. 27, 2009.
U.S. Appl. No. 11/536,781 Final Office Action mailed Jan. 15, 2010.
U.S. Appl. No. 11/420,015 Office Action mailed Mar. 20, 2008.
U.S. Appl. No. 11/420,015 Final Office Action mailed Sep. 3, 2008.
U.S. Appl. No. 11/420,015 Office Action mailed Dec. 2, 2008.
U.S. Appl. No. 11/420,016 Office Action mailed Mar. 3, 2008.
U.S. Appl. No. 11/420,016 Final Office Action mailed Aug. 29, 2008.
U.S. Appl. No. 11/420,017 Final Office Action mailed Dec. 31, 2009.
U.S. Appl. No. 11/420,018 Office Action mailed Mar. 21, 2008.
U.S. Appl. No. 11/420,018 Final Office Action mailed Aug. 29, 2008.
U.S. Appl. No. 11/420,018 Office Action mailed Dec. 3, 2008.
U.S. Appl. No. 11/536,733 Office Action mailed Dec. 30, 2008.
U.S. Appl. No. 11/619,216 Office Action mailed Jan. 26, 2010.
U.S. Appl. No. 11/619,253 Office Action mailed Apr. 2, 2009.
U.S. Appl. No. 11/352,760 Office Action mailed Sep. 16, 2010.
U.S. Appl. No. 11/352,680 Office Action mailed Jun. 10, 2010.
U.S. Appl. No. 11/352,680 Final Office Action mailed Sep. 7, 2010.
U.S. Appl. No. 11/352,679 Office Action mailed May 28, 2010.
U.S. Appl. No. 11/352,679 Final Office Action mailed Nov. 15, 2010.
U.S. Appl. No. 11/372,317 Office Action mailed Sep. 23, 2010.
U.S. Appl. No. 11/372,319 Office Action mailed Apr. 21, 2010.
U.S. Appl. No. 11/372,319 Final Office Action mailed Jul. 2, 2010.
U.S. Appl. No. 11/420,014 Final Office Action mailed Apr. 30, 2010.
U.S. Appl. No. 11/420,017 Final Office Action mailed Sep. 23, 2010.
U.S. Appl. No. 11/619,216 Final Office Action mailed Jun. 25, 2010.

* cited by examiner

DYNAMIC PROSODY ADJUSTMENT FOR VOICE-RENDERING SYNTHESIZED DATA

BACKGROUND OF THE INVENTION

1. Field of the Invention

The field of the invention is data processing, or, more specifically, methods, systems, and products for dynamic prosody adjustment for voice-rendering synthesized data.

2. Description of Related Art

Despite having more access to data and having more devices to access that data, users are often time constrained. One reason for this time constraint is that users typically must access data of disparate data types from disparate data sources on data type-specific devices using data type-specific applications. One or more such data type-specific devices may be cumbersome for use at a particular time due to any number of external circumstances. Examples of external circumstances that may make data type-specific devices cumbersome to use include crowded locations, uncomfortable locations such as a train or car, user activity such as walking, visually intensive activities such as driving, and others as will occur to those of skill in the art. There is therefore an ongoing need for data management and data rendering for disparate data types that provides access to uniform data type access to content from disparate data sources.

SUMMARY OF THE INVENTION

Methods, systems, and products are disclosed for dynamic prosody adjustment for voice-rendering synthesized data that include retrieving synthesized data to be voice rendered; identifying, for the synthesized data to be voice rendered, a particular prosody setting; determining, in dependence upon the synthesized data to be voice rendered and the context information for the context in which the synthesized data is to be voice rendered, a section of the synthesized data to be rendered; and rendering the section of the synthesized data in dependence upon the identified particular prosody setting.

Identifying, for the synthesized data to be voice rendered, a particular prosody setting may also include retrieving a prosody identification from the synthesized data to be voice rendered or identifying a particular prosody in dependence upon a user instruction. Identifying, for the synthesized data to be voice rendered, a particular prosody setting may also include selecting the particular prosody setting in dependence upon user prosody history or determining current voice characteristics of the user and selecting the particular prosody setting in dependence upon the current voice characteristics of the user.

Determining, in dependence upon the synthesized data to be voice rendered and the context information for the context in which the synthesized data is to be voice rendered, a section of the synthesized data to be rendered may also include determining the context information for the context in which the synthesized data is to be voice rendered, identifying in dependence upon the context information a section length, and selecting a section of the synthesized data to be rendered in dependence upon the identified section length. The section length may be a quantity of synthesized content. Identifying in dependence upon the context information a section length may also include identifying in dependence upon the context information a rendering time and determining a section length to be rendered in dependence upon the prosody settings and the rendering time.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
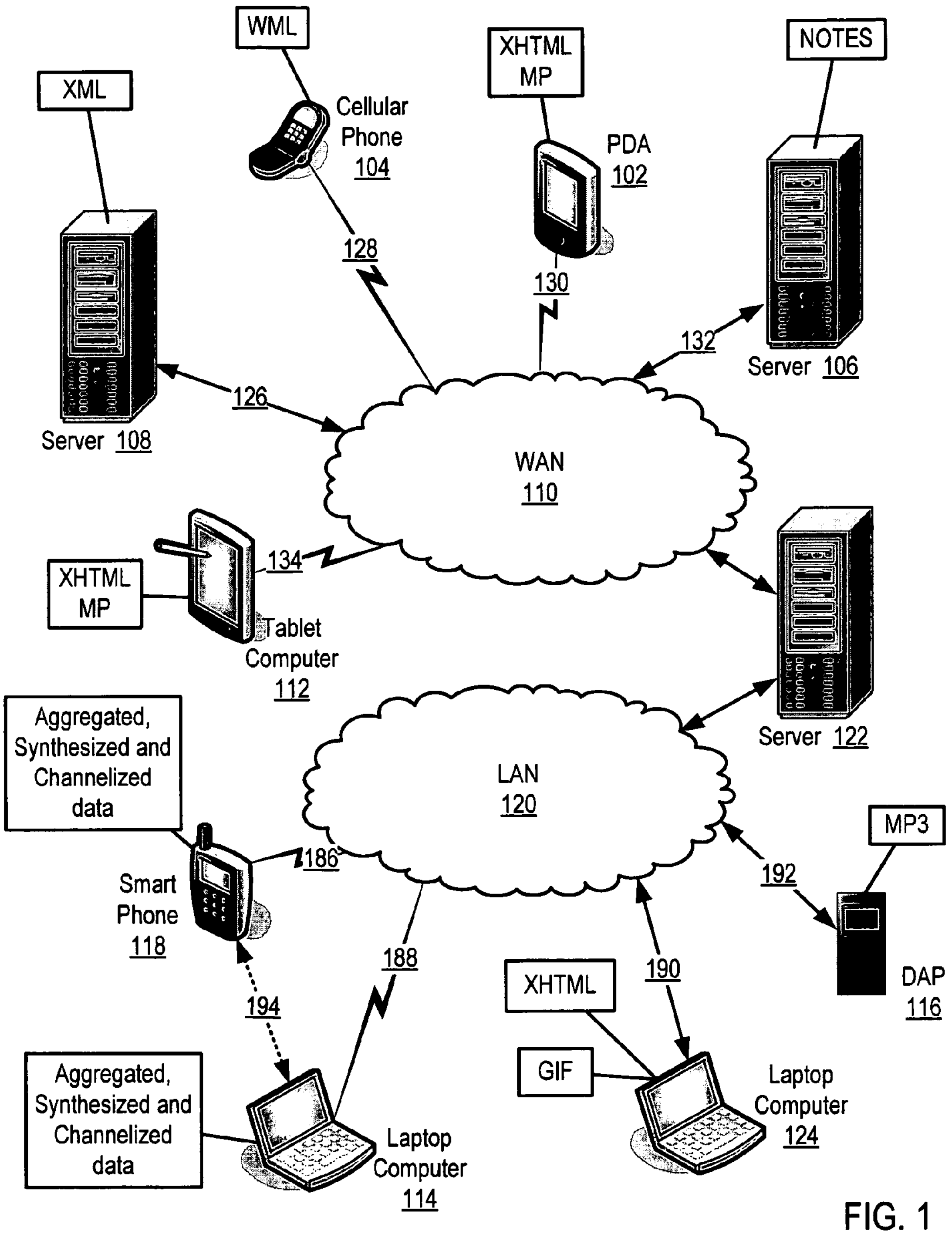
FIG. 1 sets forth a network diagram illustrating an exemplary system for data management and data rendering for disparate data types according to embodiments of the present invention.

Exemplary Architecture for Data Management and Data Rendering for Disparate Data Types Exemplary methods, systems, and products for data management and data rendering for disparate data types from disparate data sources according to embodiments of the present invention are described with reference to the accompanying drawings, beginning with FIG. 1. FIG. 1 sets forth a network diagram illustrating an exemplary system for data management and data rendering for disparate data types according to embodiments of the present invention. The system of FIG. 1 operates generally to manage and render data for disparate data types according to embodiments of the present invention by aggregating data of disparate data types from disparate data sources, synthesizing the aggregated data of disparate data types into data of a uniform data type, identifying an action in dependence upon the synthesized data, and executing the identified action.

Disparate data types are data of different kind and form. That is, disparate data types are data of different kinds. The distinctions in data that define the disparate data types may include a difference in data structure, file format, protocol in which the data is transmitted, and other distinctions as will occur to those of skill in the art. Examples of disparate data types include MPEG-1 Audio Layer 3 ('MP3') files, Extensible markup language documents ('XML'), email documents, and so on as will occur to those of skill in the art. Disparate data types typically must be rendered on data type-specific devices. For example, an MPEG-1 Audio Layer 3 ('MP3') file is typically played by an MP3 player, a Wireless Markup Language ('WML') file is typically accessed by a wireless device, and so on.

The term disparate data sources means sources of data of disparate data types. Such data sources may be any device or network location capable of providing access to data of a disparate data type. Examples of disparate data sources include servers serving up files, web sites, cellular phones, PDAs, MP3 players, and so on as will occur to those of skill in the art.

The system of FIG. 1 includes a number of devices operating as disparate data sources connected for data communications in networks. The data processing system of FIG. 1 includes a wide area network ("WAN") (110) and a local area network ("LAN") (120). "LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

In the example of FIG. 1, server (122) operates as a gateway between the LAN (120) and the WAN (110). The network connection aspect of the architecture of FIG. 1 is only for explanation, not for limitation. In fact, systems for data management and data rendering for disparate data types according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, a plurality of devices are connected to a LAN and WAN respectively, each implementing a data source and each having stored upon it data of a particular data type. In the example of FIG. 1, a server (108) is connected to the WAN through a wireline connection (126). The server (108) of FIG. 1 is a data source for an RSS feed, which the server delivers in the form of an XML file. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This information is delivered as an XML file called RSS feed, webfeed, RSS stream, or RSS channel.

In the example of FIG. 1, another server (106) is connected to the WAN through a wireline connection (132). The server (106) of FIG. 1 is a data source for data stored as a Lotus NOTES file. In the example of FIG. 1, a personal digital assistant ('PDA') (102) is connected to the WAN through a wireless connection (130). The PDA is a data source for data stored in the form of an XHTML Mobile Profile ('XHTML MP') document.

In the example of FIG. 1, a cellular phone (104) is connected to the WAN through a wireless connection (128). The cellular phone is a data source for data stored as a Wireless Markup Language ('WML') file. In the example of FIG. 1, a tablet computer (112) is connected to the WAN through a wireless connection (134). The tablet computer (112) is a data source for data stored in the form of an XHTML MP document.

The system of FIG. 1 also includes a digital audio player ('DAP') (116). The DAP (116) is connected to the LAN through a wireline connection (192). The digital audio player ('DAP') (116) of FIG. 1 is a data source for data stored as an MP3 file. The system of FIG. 1 also includes a laptop computer (124). The laptop computer is connected to the LAN through a wireline connection (190). The laptop computer (124) of FIG. 1 is a data source data stored as a Graphics Interchange Format ('GIF') file. The laptop computer (124) of FIG. 1 is also a data source for data in the form of Extensible Hypertext Markup Language ('XHTML') documents.

The system of FIG. 1 includes a laptop computer (114) and a smart phone (118) each having installed upon it a data management and rendering module proving uniform access to the data of disparate data types available from the disparate data sources. The exemplary laptop computer (114) of FIG. 1 connects to the LAN through a wireless connection (188). The exemplary smart phone (118) of FIG. 1 also connects to the LAN through a wireless connection (186). The laptop computer (114) and smart phone (118) of FIG. 1 have installed and running on them software capable generally of data management and data rendering for disparate data types by aggregating data of disparate data types from disparate data sources; synthesizing the aggregated data of disparate data types into data of a uniform data type; identifying an action in dependence upon the synthesized data; and executing the identified action.

Aggregated data is the accumulation, in a single location, of data of disparate types. This location of the aggregated data may be either physical, such as, for example, on a single computer containing aggregated data, or logical, such as, for example, a single interface providing access to the aggregated data.

Synthesized data is aggregated data which has been synthesized into data of a uniform data type. The uniform data type may be implemented as text content and markup which has been translated from the aggregated data. Synthesized data may also contain additional voice markup inserted into the text content, which adds additional voice capability.

Alternatively, any of the devices of the system of FIG. 1 described as sources may also support a data management and rendering module according to the present invention. For example, the server (106), as described above, is capable of supporting a data management and rendering module providing uniform access to the data of disparate data types available from the disparate data sources. Any of the devices of FIG. 1, as described above, such as, for example, a PDA, a tablet computer, a cellular phone, or any other device as will occur to those of skill in the art, are capable of supporting a data management and rendering module according to the present invention.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

A method for data management and data rendering for disparate data types in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in data management and data rendering for disparate data types according to embodiments of the present invention. The computer (152) of FIG. 2 includes at least one computer processor (156) or 'CPU' as well as random access memory (168) ('RAM') which is connected through a system bus (160) to a processor (156) and to other components of the computer.

Stored in RAM (168) is a data management and data rendering module (140), computer program instructions for data management and data rendering for disparate data types capable generally of aggregating data of disparate data types from disparate data sources; synthesizing the aggregated data of disparate data types into data of a uniform data type; identifying an action in dependence upon the synthesized data; and executing the identified action. Data management and data rendering for disparate data types advantageously provides to the user the capability to efficiently access and manipulate data gathered from disparate data type-specific resources. Data management and data rendering for disparate data types also provides a uniform data type such that a user may access data gathered from disparate data type-specific resources on a single device.

Figure 2:
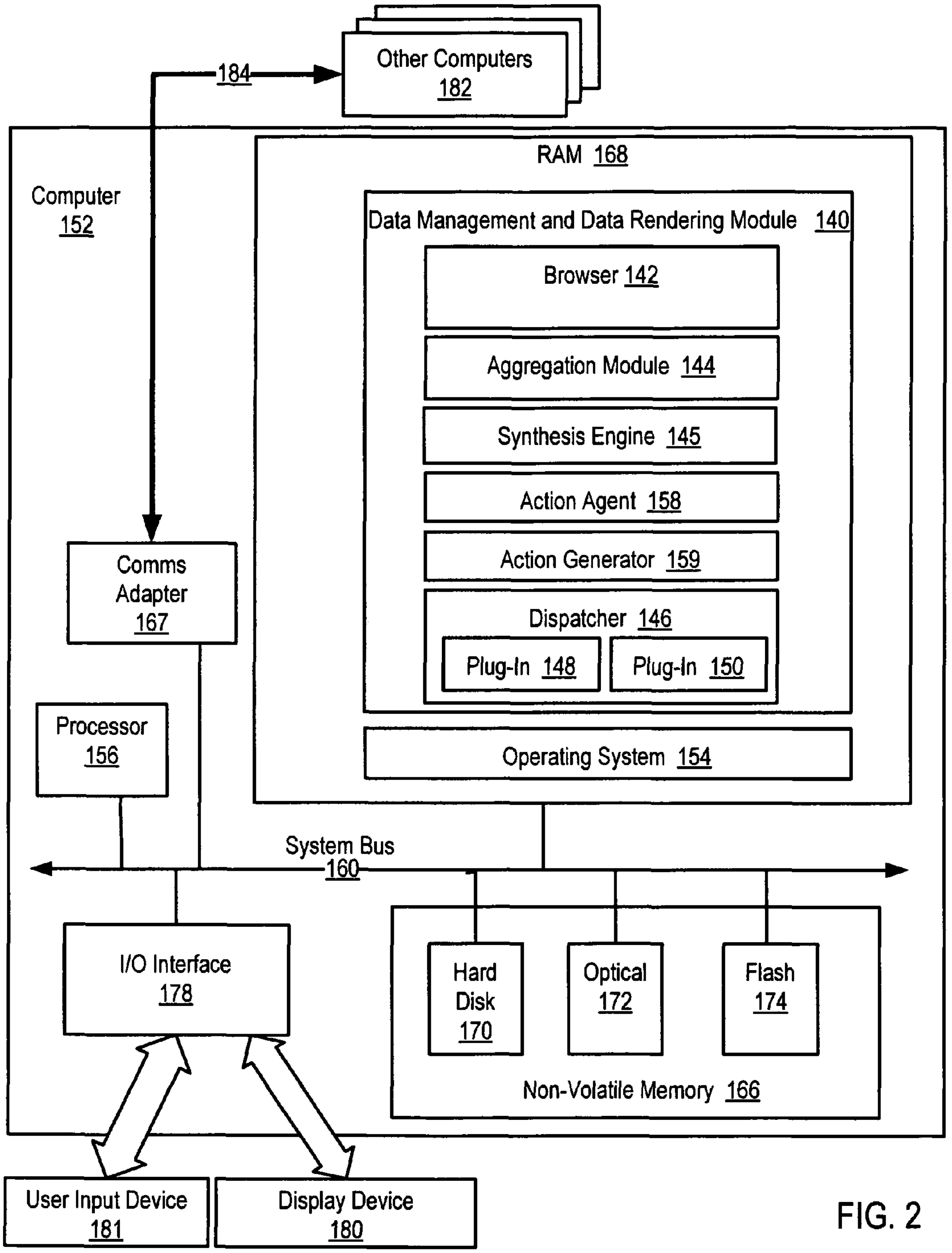
FIG. 2 sets forth a block diagram of automated computing machinery comprising an exemplary computer useful in data management and data rendering for disparate data types according to embodiments of the present invention.

The data management and data rendering module (140) of FIG. 2 also includes computer program instructions for retrieving synthesized data to be voice rendered; identifying, for the synthesized data to be voice rendered, a particular prosody setting; determining, in dependence upon the synthesized data to be voice rendered and the context information for the context in which the synthesized data is to be voice rendered, a section of the synthesized data to be rendered; and rendering the section of the synthesized data in dependence upon the identified particular prosody setting.

Also stored in RAM (168) is an aggregation module (144), computer program instructions for aggregating data of disparate data types from disparate data sources capable generally of receiving, from an aggregation process, a request for data; identifying, in response to the request for data, one of two or more disparate data sources as a source for data; retrieving, from the identified data source, the requested data; and returning to the aggregation process the requested data. Aggregating data of disparate data types from disparate data sources advantageously provides the capability to collect data from multiple sources for synthesis.

Also stored in RAM is a synthesis engine (145), computer program instructions for synthesizing aggregated data of disparate data types into data of a uniform data type capable generally of receiving aggregated data of disparate data types and translating each of the aggregated data of disparate data types into translated data composed of text content and markup associated with the text content. Synthesizing aggregated data of disparate data types into data of a uniform data type advantageously provides synthesized data of a uniform data type which is capable of being accessed and manipulated by a single device.

Also stored in RAM (168) is an action generator module (159), a set of computer program instructions for identifying actions in dependence upon synthesized data and often user instructions. Identifying an action in dependence upon the synthesized data advantageously provides the capability of interacting with and managing synthesized data.

Also stored in RAM (168) is an action agent (158), a set of computer program instructions for administering the execution of one or more identified actions. Such execution may be executed immediately upon identification, periodically after identification, or scheduled after identification as will occur to those of skill in the art.

Also stored in RAM (168) is a dispatcher (146), computer program instructions for receiving, from an aggregation process, a request for data; identifying, in response to the request for data, one of a plurality of disparate data sources as a source for the data; retrieving, from the identified data source, the requested data; and returning, to the aggregation process, the requested data. Receiving, from an aggregation process, a request for data; identifying, in response to the request for data, one of a plurality of disparate data sources as a source for the data; retrieving, from the identified data source, the requested data; and returning, to the aggregation process, the requested data advantageously provides the capability to access disparate data sources for aggregation and synthesis.

The dispatcher (146) of FIG. 2 also includes a plurality of plug-in modules (148, 150), computer program instructions for retrieving, from a data source associated with the plug-in, requested data for use by an aggregation process. Such plug-ins isolate the general actions of the dispatcher from the specific requirements needed to retrieved data of a particular type.

Also stored in RAM (168) is a browser (142), computer program instructions for providing an interface for the user to synthesized data. Providing an interface for the user to synthesized data advantageously provides a user access to content of data retrieved from disparate data sources without having to use data source-specific devices. The browser (142) of FIG. 2 is capable of multimodal interaction capable of receiving multimodal input and interacting with users through multimodal output. Such multimodal browsers typically support multimodal web pages that provide multimodal interaction through hierarchical menus that may be speech driven.

Also stored in RAM is an OSGi Service Framework (157) running on a Java Virtual Machine ('JVM') (155). "OSGi" refers to the Open Service Gateway initiative, an industry organization developing specifications delivery of service bundles, software middleware providing compliant data communications and services through services gateways. The OSGi specification is a Java based application layer framework that gives service providers, network operator device makers, and appliance manufacturer's vendor neutral application and device layer APIs and functions. OSGi works with a variety of networking technologies like Ethernet, Bluetooth, the 'Home, Audio and Video Interoperability standard' (HAVi), IEEE 1394, Universal Serial Bus (USB), WAP, X-10, Lon Works, HomePlug and various other networking technologies. The OSGi specification is available for free download from the OSGi website at www.osgi.org.

An OSGi service framework (157) is written in Java and therefore, typically runs on a Java Virtual Machine (JVM) (155). In OSGi, the service framework (157) is a hosting platform for running 'services'. The term 'service' or 'services' in this disclosure, depending on context, generally refers to OSGi-compliant services.

Services are the main building blocks for creating applications according to the OSGi. A service is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services in OSGi are packaged in 'bundles' with other files, images, and resources that the services need for execution. A bundle is a Java archive or 'JAR' file including one or more service implementations, an activator class, and a manifest file. An activator class is a Java class that the service framework uses to start and stop a bundle. A manifest file is a standard text file that describes the contents of the bundle.

The service framework (157) in OSGi also includes a service registry. The service registry includes a service registration including the service's name and an instance of a class that implements the service for each bundle installed on the framework and registered with the service registry. A bundle may request services that are not included in the bundle, but are registered on the framework service registry. To find a service, a bundle performs a query on the framework's service registry.

Data management and data rendering according to embodiments of the present invention may be usefully invoke one ore more OSGi services. OSGi is included for explanation and not for limitation. In fact, data management and data rendering according embodiments of the present invention may usefully employ many different technologies an all such technologies are well within the scope of the present invention.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art. The operating system (154) and data management and data rendering module (140) in the example of FIG. 2 are shown in RAM (168), but many components of such software typically are stored in non-volatile memory (166) also.

Computer (152) of FIG. 2 includes non-volatile computer memory (166) coupled through a system bus (160) to a processor (156) and to other components of the computer (152). Non-volatile computer memory (166) may be implemented as a hard disk drive (170), an optical disk drive (172), an electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out serially through RS-232 connections, through external buses such as a USB, through data communications networks such as IP networks, and in other ways as will occur to those of skill in the art. Communications adapters implement the hardware level of data communications through which one computer sends data communications to another computer, directly or through a network. Examples of communications adapters useful for data management and data rendering for disparate data types from disparate data sources according to embodiments of the present invention include modems for wired dial-up communications, Ethernet (IEEE 802.3) adapters for wired network communications, and 802.11b adapters for wireless network communications.

Figure 3:
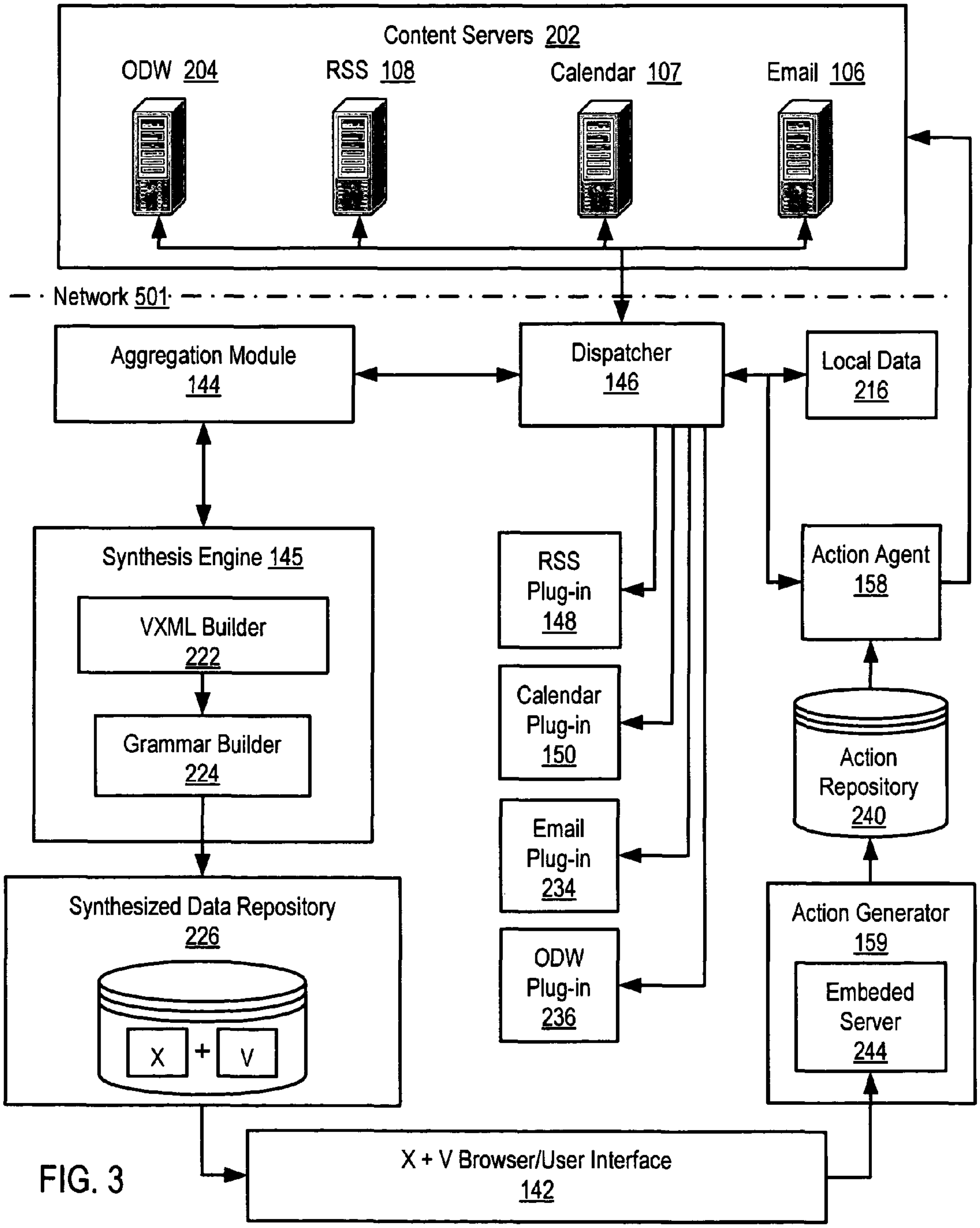
FIG. 3 sets forth a block diagram depicting a system for data management and data rendering for disparate data types according to of the present invention.

For further explanation, FIG. 3 sets forth a block diagram depicting a system for data management and data rendering for disparate data types according to of the present invention. The system of FIG. 3 includes an aggregation module (144), computer program instructions for aggregating data of disparate data types from disparate data sources capable generally of receiving, from an aggregation process, a request for data; identifying, in response to the request for data, one of two or more disparate data sources as a source for data; retrieving, from the identified data source, the requested data; and returning to the aggregation process the requested data.

The system of FIG. 3 includes a synthesis engine (145), computer program instructions for synthesizing aggregated data of disparate data types into data of a uniform data type capable generally of receiving aggregated data of disparate data types and translating each of the aggregated data of disparate data types into translated data composed of text content and markup associated with the text content.

The synthesis engine (145) includes a VXML Builder (222) module, computer program instructions for translating each of the aggregated data of disparate data types into text content and markup associated with the text content. The synthesis engine (145) also includes a grammar builder (224) module, computer program instructions for generating grammars for voice markup associated with the text content.

The system of FIG. 3 includes a synthesized data repository (226) data storage for the synthesized data created by the synthesis engine in X+V format. The system of FIG. 3 also includes an X+V browser (142), computer program instructions capable generally of presenting the synthesized data from the synthesized data repository (226) to the user. Presenting the synthesized data may include both graphical display and audio representation of the synthesized data. As discussed below with reference to FIG. 4, one way presenting the synthesized data to a user may be carried out is by presenting synthesized data through one or more channels.

The system of FIG. 3 includes a dispatcher (146) module, computer program instructions for receiving, from an aggregation process, a request for data; identifying, in response to the request for data, one of a plurality of disparate data sources as a source for the data; retrieving, from the identified data source, the requested data; and returning, to the aggregation process, the requested data. The dispatcher (146) module accesses data of disparate data types from disparate data sources for the aggregation module (144), the synthesis engine (145), and the action agent (158). The system of FIG. 3 includes data source-specific plug-ins (148-150, 234-236) used by the dispatcher to access data as discussed below.

In the system of FIG. 3, the data sources include local data (216) and content servers (202). Local data (216) is data contained in memory or registers of the automated computing machinery. In the system of FIG. 3, the data sources also include content servers (202). The content servers (202) are connected to the dispatcher (146) module through a network (501). An RSS server (108) of FIG. 3 is a data source for an RSS feed, which the server delivers in the form of an XML file. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This information is delivered as an XML file called RSS feed, webfeed, RSS stream, or RSS channel.

In the system of FIG. 3, an email server (106) is a data source for email. The server delivers this email in the form of a Lotus NOTES file. In the system of FIG. 3, a calendar server (107) is a data source for calendar information. Calendar information includes calendared events and other related information. The server delivers this calendar information in the form of a Lotus NOTES file.

In the system of FIG. 3, an IBM On Demand Workstation (204) a server providing support for an On Demand Workplace ('ODW') that provides productivity tools, and a virtual space to share ideas and expertise, collaborate with others, and find information.

The system of FIG. 3 includes data source-specific plug-ins (148-150, 234-236). For each data source listed above, the dispatcher uses a specific plug-in to access data.

The system of FIG. 3 includes an RSS plug-in (148) associated with an RSS server (108) running an RSS application. The RSS plug-in (148) of FIG. 3 retrieves the RSS feed from the RSS server (108) for the user and provides the RSS feed in an XML file to the aggregation module.

The system of FIG. 3 includes a calendar plug-in (150) associated with a calendar server (107) running a calendaring application. The calendar plug-in (150) of FIG. 3 retrieves calendared events from the calendar server (107) for the user and provides the calendared events to the aggregation module.

The system of FIG. 3 includes an email plug-in (234) associated with an email server (106) running an email application. The email plug-in (234) of FIG. 3 retrieves email from the email server (106) for the user and provides the email to the aggregation module.

The system of FIG. 3 includes an On Demand Workstation ('ODW') plug-in (236) associated with an ODW server (204) running an ODW application. The ODW plug-in (236) of FIG. 3 retrieves ODW data from the ODW server (204) for the user and provides the ODW data to the aggregation module.

The system of FIG. 3 also includes an action generator module (159), computer program instructions for identifying an action from the action repository (240) in dependence upon the synthesized data capable generally of receiving a user instruction, selecting synthesized data in response to the user instruction, and selecting an action in dependence upon the user instruction and the selected data. The action generator module (159) contains an embedded server (244). The embedded server (244) receives user instructions through the X+V browser (142). Upon identifying an action from the action repository (240), the action generator module (159) employs the action agent (158) to execute the action. The system of FIG. 3 includes an action agent (158), computer program instructions for executing an action capable generally of executing actions.

Data Management and Data Rendering for Disparate Data Types

Figure 4:
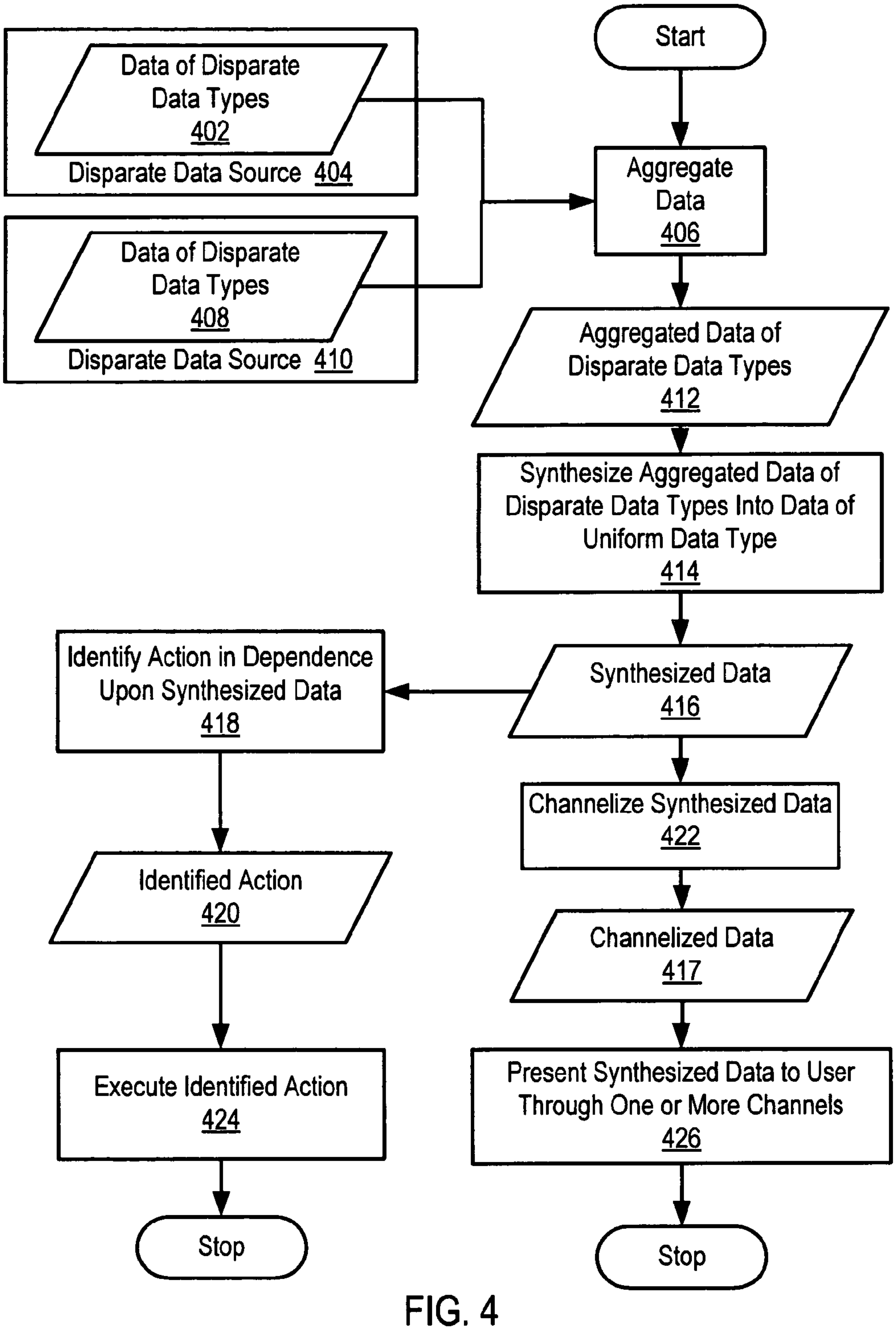
FIG. 4 sets forth a flow chart illustrating an exemplary method for data management and data rendering for disparate data types according to embodiments of the present invention.

For further explanation, FIG. 4 sets forth a flow chart illustrating an exemplary method for data management and data rendering for disparate data types according to embodiments of the present invention. The method of FIG. 4 includes aggregating (406) data of disparate data types (402, 408) from disparate data sources (404, 410). As discussed above, aggregated data of disparate data types is the accumulation, in a single location, of data of disparate types. This location of the aggregated data may be either physical, such as, for example, on a single computer containing aggregated data, or logical, such as, for example, a single interface providing access to the aggregated data.

Figure 5:
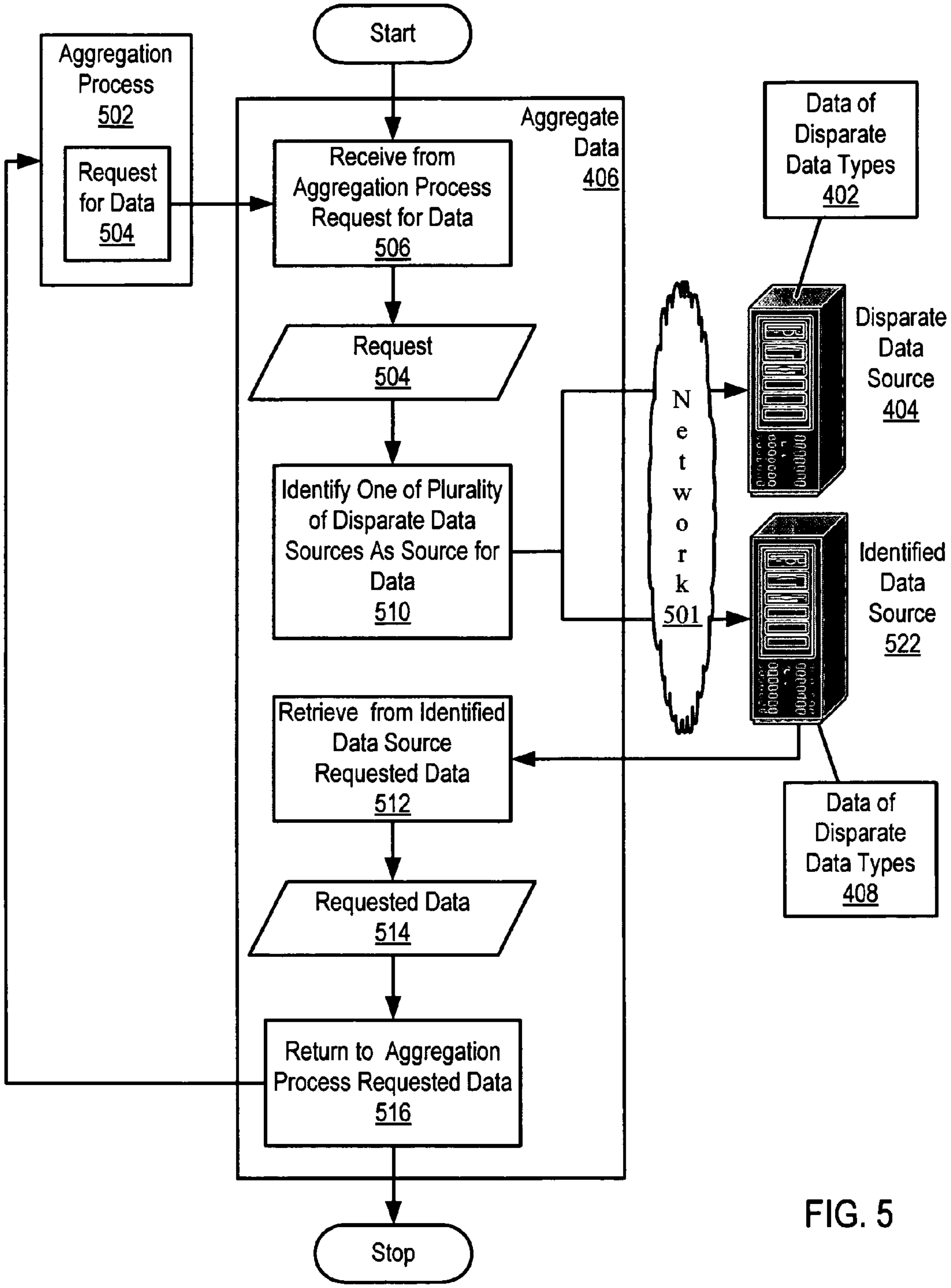
FIG. 5 sets forth a flow chart illustrating an exemplary method for aggregating data of disparate data types from disparate data sources according to embodiments of the present invention.

Aggregating (406) data of disparate data types (402, 408) from disparate data sources (404, 410) according to the method of FIG. 4 may be carried out by receiving, from an aggregation process, a request for data; identifying, in response to the request for data, one of two or more disparate data sources as a source for data; retrieving, from the identified data source, the requested data; and returning to the aggregation process the requested data as discussed in more detail below with reference to FIG. 5.

The method of FIG. 4 also includes synthesizing (414) the aggregated data of disparate data types (412) into data of a uniform data type. Data of a uniform data type is data having been created or translated into a format of predetermined type. That is, uniform data types are data of a single kind that may be rendered on a device capable of rendering data of the uniform data type. Synthesizing (414) the aggregated data of disparate data types (412) into data of a uniform data type advantageously results in a single point of access for the content of the aggregation of disparate data retrieved from disparate data sources.

One example of a uniform data type useful in synthesizing (414) aggregated data of disparate data types (412) into data of a uniform data type is XHTML plus Voice. XHTML plus Voice ('X+V') is a Web markup language for developing multimodal applications, by enabling voice in a presentation layer with voice markup. X+V provides voice-based interaction in small and mobile devices using both voice and visual elements. X+V is composed of three main standards: XHTML, VoiceXML, and XML Events. Given that the Web application environment is event-driven, X+V incorporates the Document Object Model (DOM) eventing framework used in the XML Events standard. Using this framework, X+V defines the familiar event types from HTML to create the correlation between visual and voice markup.

Synthesizing (414) the aggregated data of disparate data types (412) into data of a uniform data type may be carried out by receiving aggregated data of disparate data types and translating each of the aggregated data of disparate data types into text content and markup associated with the text content as discussed in more detail with reference to FIG. 9. In the method of FIG. 4, synthesizing the aggregated data of disparate data types (412) into data of a uniform data type may be carried out by translating the aggregated data into X+V, or any other markup language as will occur to those of skill in the art.

The method for data management and data rendering of FIG. 4 also includes identifying (418) an action in dependence upon the synthesized data (416). An action is a set of computer instructions that when executed carry out a predefined task. The action may be executed in dependence upon the synthesized data immediately or at some defined later time. Identifying (418) an action in dependence upon the synthesized data (416) may be carried out by receiving a user instruction, selecting synthesized data in response to the user instruction, and selecting an action in dependence upon the user instruction and the selected data.

A user instruction is an event received in response to an act by a user. Exemplary user instructions include receiving events as a result of a user entering a combination of keystrokes using a keyboard or keypad, receiving speech from a user, receiving an event as a result of clicking on icons on a visual display by using a mouse, receiving an event as a result of a user pressing an icon on a touchpad, or other user instructions as will occur to those of skill in the art. Receiving a user instruction may be carried out by receiving speech from a user, converting the speech to text, and determining in dependence upon the text and a grammar the user instruction. Alternatively, receiving a user instruction may be carried out by receiving speech from a user and determining the user instruction in dependence upon the speech and a grammar.

The method of FIG. 4 also includes executing (424) the identified action (420). Executing (424) the identified action (420) may be carried out by calling a member method in an action object identified in dependence upon the synthesized data, executing computer program instructions carrying out the identified action, as well as other ways of executing an identified action as will occur to those of skill in the art. Executing (424) the identified action (420) may also include determining the availability of a communications network required to carry out the action and executing the action only if the communications network is available and postponing executing the action if the communications network connection is not available. Postponing executing the action if the communications network connection is not available may include enqueuing identified actions into an action queue, storing the actions until a communications network is available, and then executing the identified actions. Another way that waiting to execute the identified action (420) may be carried out is by inserting an entry delineating the action into a container, and later processing the container. A container could be any data structure suitable for storing an entry delineating an action, such as, for example, an XML file.

Executing (424) the identified action (420) may include modifying the content of data of one of the disparate data sources. Consider for example, an action called deleteOldEmail( ) that when executed deletes not only synthesized data translated from email, but also deletes the original source email stored on an email server coupled for data communications with a data management and data rendering module operating according to the present invention.

The method of FIG. 4 also includes channelizing (422) the synthesized data (416). A channel is a logical aggregation of data content for presentation to a user. Channelizing (422) the synthesized data (416) may be carried out by identifying attributes of the synthesized data, characterizing the attributes of the synthesized data, and assigning the data to a predetermined channel in dependence upon the characterized attributes and channel assignment rules. Channelizing the synthesized data advantageously provides a vehicle for presenting related content to a user. Examples of such channelized data may be a 'work channel' that provides a channel of work related content, an 'entertainment channel' that provides a channel of entertainment content an so on as will occur to those of skill in the art.

The method of FIG. 4 may also include presenting (426) the synthesized data (416) to a user through one or more channels. One way presenting (426) the synthesized data (416) to a user through one or more channels may be carried out is by presenting summaries or headings of available channels. The content presented through those channels can be accessed via this presentation in order to access the synthesized data (416). Another way presenting (426) the synthesized data (416) to a user through one or more channels may be carried out by displaying or playing the synthesized data (416) contained in the channel. Text might be displayed visually, or it could be translated into a simulated voice and played for the user.

Aggregating Data of Disparate Data Types

For further explanation, FIG. 5 sets forth a flow chart illustrating an exemplary method for aggregating data of disparate data types from disparate data sources according to embodiments of the present invention. In the method of FIG. 5, aggregating (406) data of disparate data types (402, 408) from disparate data sources (404, 522) includes receiving (506), from an aggregation process (502), a request for data (508). A request for data may be implemented as a message, from the aggregation process, to a dispatcher instructing the dispatcher to initiate retrieving the requested data and returning the requested data to the aggregation process.

In the method of FIG. 5, aggregating (406) data of disparate data types (402, 408) from disparate data sources (404, 522) also includes identifying (510), in response to the request for data (508), one of a plurality of disparate data sources (404, 522) as a source for the data. Identifying (510), in response to the request for data (508), one of a plurality of disparate data sources (404, 522) as a source for the data may be carried in a number of ways. One way of identifying (510) one of a plurality of disparate data sources (404, 522) as a source for the data may be carried out by receiving, from a user, an identification of the disparate data source; and identifying, to the aggregation process, the disparate data source in dependence upon the identification as discussed in more detail below with reference to FIG. 7.

Another way of identifying, to the aggregation process (502), disparate data sources is carried out by identifying, from the request for data, data type information and identifying from the data source table sources of data that correspond to the data type as discussed in more detail below with reference to FIG. 8. Still another way of identifying one of a plurality of data sources is carried out by identifying, from the request for data, data type information; searching, in dependence upon the data type information, for a data source; and identifying from the search results returned in the data source search, sources of data corresponding to the data type also discussed below in more detail with reference to FIG. 8.

The three methods for identifying one of a plurality of data sources described in this specification are for explanation and not for limitation. In fact, there are many ways of identifying one of a plurality of data sources and all such ways are well within the scope of the present invention.

The method for aggregating (406) data of FIG. 5 includes retrieving (512), from the identified data source (522), the requested data (514). Retrieving (512), from the identified data source (522), the requested data (514) includes determining whether the identified data source requires data access information to retrieve the requested data; retrieving, in dependence upon data elements contained in the request for data, the data access information if the identified data source requires data access information to retrieve the requested data; and presenting the data access information to the identified data source as discussed in more detail below with reference to FIG. 6. Retrieving (512) the requested data according the method of FIG. 5 may be carried out by retrieving the data from memory locally, downloading the data from a network location, or any other way of retrieving the requested data that will occur to those of skill in the art. As discussed above, retrieving (512), from the identified data source (522), the requested data (514) may be carried out by a data-source-specific plug-in designed to retrieve data from a particular data source or a particular type of data source.

In the method of FIG. 5, aggregating (406) data of disparate data types (402, 408) from disparate data sources (404, 522) also includes returning (516), to the aggregation process (502), the requested data (514). Returning (516), to the aggregation process (502), the requested data (514) returning the requested data to the aggregation process in a message, storing the data locally and returning a pointer pointing to the location of the stored data to the aggregation process, or any other way of returning the requested data that will occur to those of skill in the art.

Figure 6:
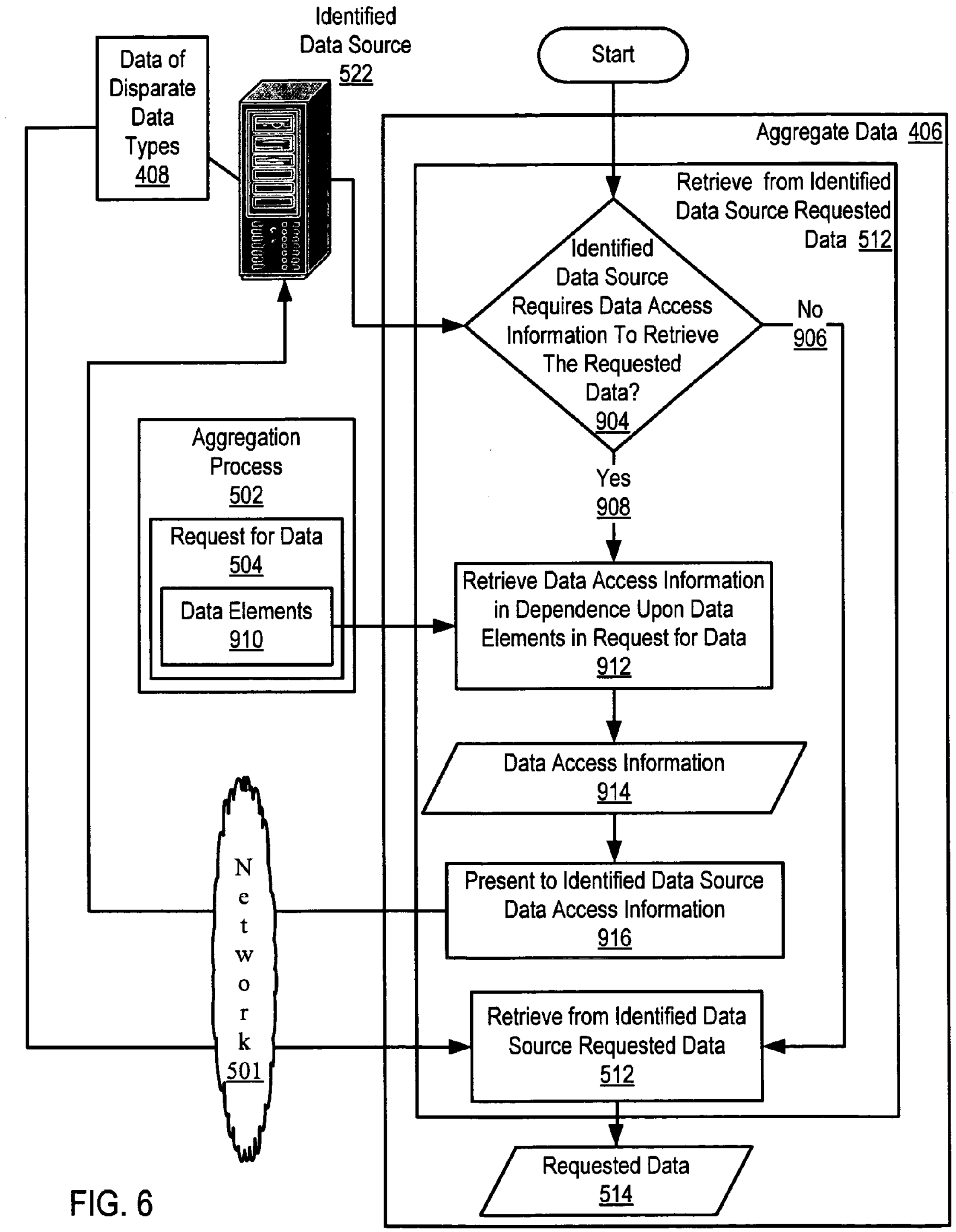
FIG. 6 sets forth a flow chart illustrating an exemplary method for retrieving, from the identified data source, the requested data according to embodiments of the present invention.

As discussed above with reference to FIG. 5, aggregating (406) data of FIG. 5 includes retrieving, from the identified data source, the requested data. For further explanation, therefore, FIG. 6 sets forth a flow chart illustrating an exemplary method for retrieving (512), from the identified data source (522), the requested data (514) according to embodiments of the present invention. In the method of FIG. 6, retrieving (512), from the identified data source (522), the requested data (514) includes determining (904) whether the identified data source (522) requires data access information (914) to retrieve the requested data (514). As discussed above in reference to FIG. 5, data access information is information which is required to access some types of data from some of the disparate sources of data. Exemplary data access information includes account names, account numbers, passwords, or any other data access information that will occur to those of skill in the art.

Determining (904) whether the identified data source (522) requires data access information (914) to retrieve the requested data (514) may be carried out by attempting to retrieve data from the identified data source and receiving from the data source a prompt for data access information required to retrieve the data.

Alternatively, instead of receiving a prompt from the data source each time data is retrieved from the data source, determining (904) whether the identified data source (522) requires data access information (914) to retrieve the requested data (514) may be carried out once by, for example a user, and provided to a dispatcher such that the required data access information may be provided to a data source with any request for data without prompt. Such data access information may be stored in, for example, a data source table identifying any corresponding data access information needed to access data from the identified data source.

In the method of FIG. 6, retrieving (512), from the identified data source (522), the requested data (514) also includes retrieving (912), in dependence upon data elements (910) contained in the request for data (508), the data access information (914), if the identified data source requires data access information to retrieve the requested data (908). Data elements (910) contained in the request for data (508) are typically values of attributes of the request for data (508). Such values may include values identifying the type of data to be accessed, values identifying the location of the disparate data source for the requested data, or any other values of attributes of the request for data.

Such data elements (910) contained in the request for data (508) are useful in retrieving data access information required to retrieve data from the disparate data source. Data access information needed to access data sources for a user may be usefully stored in a record associated with the user indexed by the data elements found in all requests for data from the data source. Retrieving (912), in dependence upon data elements (910) contained in the request for data (508), the data access information (914) according to FIG. 6 may therefore be carried out by retrieving, from a database in dependence upon one or more data elements in the request, a record containing the data access information and extracting from the record the data access information. Such data access information may be provided to the data source to retrieve the data.

Retrieving (912), in dependence upon data elements (910) contained in the request for data (508), the data access information (914), if the identified data source requires data access information (914) to retrieve the requested data (908), may be carried out by identifying data elements (910) contained in the request for data (508), parsing the data elements to identify data access information (914) needed to retrieve the requested data (908), identifying in a data access table the correct data access information, and retrieving the data access information (914).

The exemplary method of FIG. 6 for retrieving (512), from the identified data source (522), the requested data (514) also includes presenting (916) the data access information (914) to the identified data source (522). Presenting (916) the data access information (914) to the identified data source (522) according to the method of FIG. 6 may be carried out by providing in the request the data access information as parameters to the request or providing the data access information in response to a prompt for such data access information by a data source. That is, presenting (916) the data access information (914) to the identified data source (522) may be carried out by a selected data source specific plug-in of a dispatcher that provides data access information (914) for the identified data source (522) in response to a prompt for such data access information. Alternatively, presenting (916) the data access information (914) to the identified data source (522) may be carried out by a selected data source specific plug-in of a dispatcher that passes as parameters to request the data access information (914) for the identified data source (522) without prompt.

Figure 7:
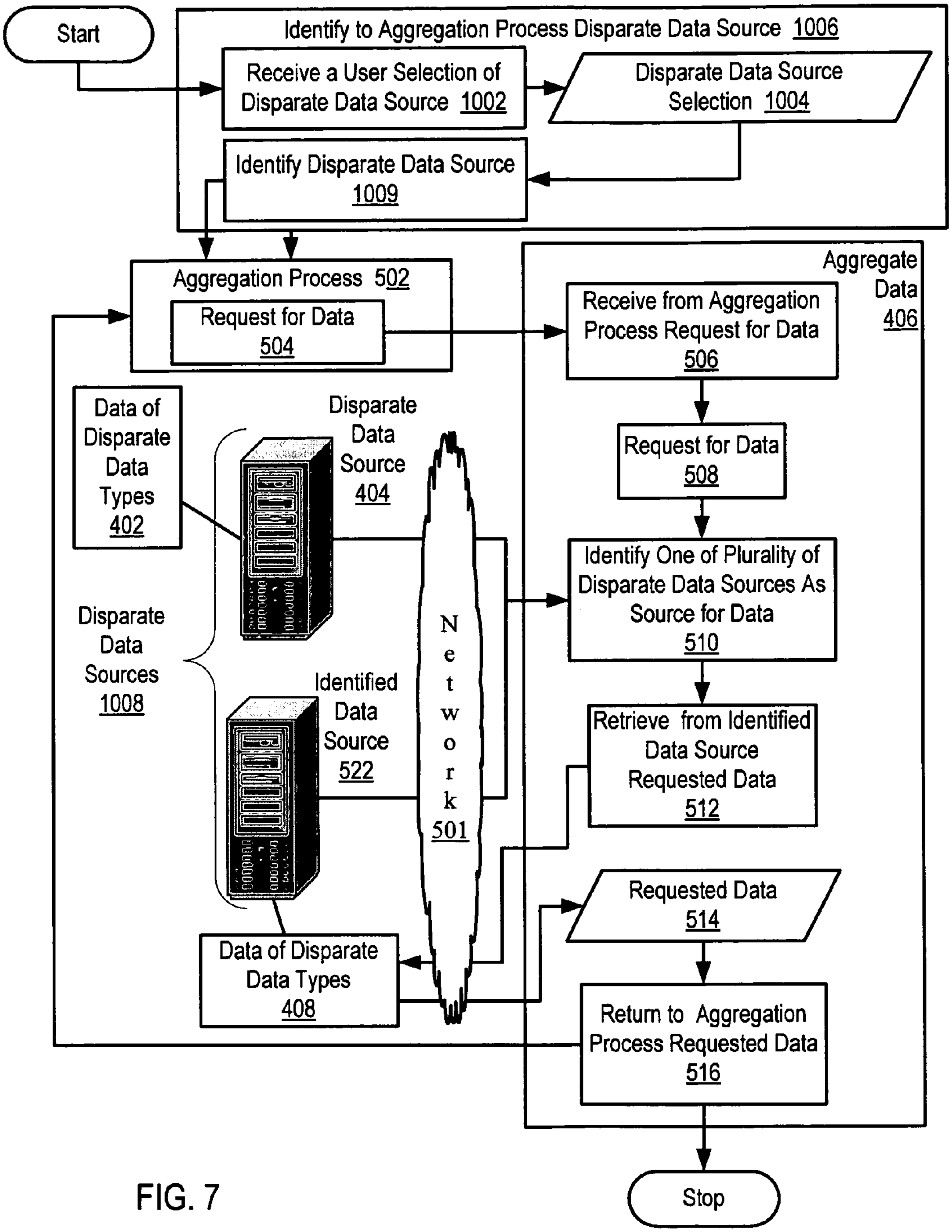
FIG. 7 sets forth a flow chart illustrating an exemplary method for aggregating data of disparate data types from disparate data sources according to the present invention.

As discussed above, aggregating data of disparate data types from disparate data sources according to embodiments of the present invention typically includes identifying, to the aggregation process, disparate data sources. That is, prior to requesting data from a particular data source, that data source typically is identified to an aggregation process. For further explanation, therefore, FIG. 7 sets forth a flow chart illustrating an exemplary method for aggregating data of disparate data types (404, 522) from disparate data sources (404, 522) according to the present invention that includes identifying (1006), to the aggregation process (502), disparate data sources (1008). In the method of FIG. 7, identifying (1006), to the aggregation process (502), disparate data sources (1008) includes receiving (1002), from a user, a selection (1004) of the disparate data source. A user is typically a person using a data management a data rendering system to manage and render data of disparate data types (402, 408) from disparate data sources (1008) according to the present invention. Receiving (1002), from a user, a selection (1004) of the disparate data source may be carried out by receiving, through a user interface of a data management and data rendering application, from the user a user instruction containing a selection of the disparate data source and identifying (1009), to the aggregation process (502), the disparate data source (404, 522) in dependence upon the selection (1004). A user instruction is an event received in response to an act by a user such as an event created as a result of a user entering a combination of keystrokes, using a keyboard or keypad, receiving speech from a user, receiving an clicking on icons on a visual display by using a mouse, pressing an icon on a touchpad, or other use act as will occur to those of skill in the art. A user interface in a data management and data rendering application may usefully provide a vehicle for receiving user selections of particular disparate data sources.

In the example of FIG. 7, identifying disparate data sources to an aggregation process is carried out by a user. Identifying disparate data sources may also be carried out by processes that require limited or no user interaction. For further explanation, FIG. 8 sets forth a flow chart illustrating an exemplary method for aggregating data of disparate data types from disparate data sources requiring little or no user action that includes identifying (1006), to the aggregation process (502), disparate data sources (1008) includes identifying (1102), from a request for data (508), data type information (1106). Disparate data types identify data of different kind and form. That is, disparate data types are data of different kinds. The distinctions in data that define the disparate data types may include a difference in data structure, file format, protocol in which the data is transmitted, and other distinctions as will occur to those of skill in the art. Data type information (1106) is information representing these distinctions in data that define the disparate data types. Identifying (1102), from the request for data (508), data type information (1106) according to the method of FIG. 8 may be carried out by extracting a data type code from the request for data. Alternatively, identifying (1102), from the request for data (508), data type information (1106) may be carried out by inferring the data type of the data being requested from the request itself, such as by extracting data elements from the request and inferring from those data elements the data type of the requested data, or in other ways as will occur to those of skill in the art.

Figure 8:
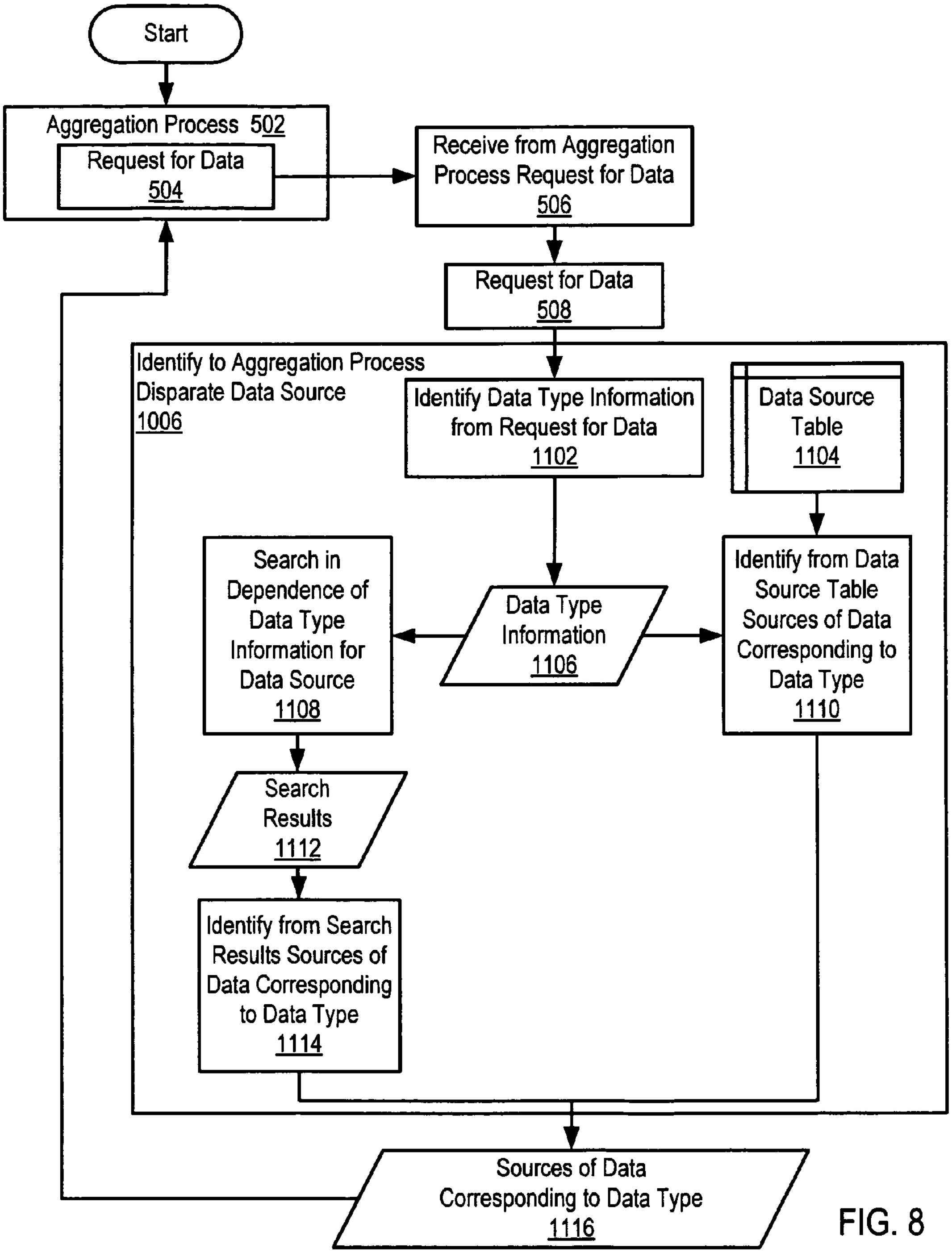
FIG. 8 sets forth a flow chart illustrating an exemplary method for aggregating data of disparate data types from disparate data sources according to the present invention.

In the method for aggregating of FIG. 8, identifying (1006), to the aggregation process (502), disparate data sources also includes identifying (1110), from a data source table (1104), sources of data corresponding to the data type (1116). A data source table is a table containing identification of disparate data sources indexed by the data type of the data retrieved from those disparate data sources. Identifying (1110), from a data source table (1104), sources of data corresponding to the data type (1116) may be carried out by performing a lookup on the data source table in dependence upon the identified data type.

In some cases no such data source may be found for the data type or no such data source table is available for identifying a disparate data source. In the method of FIG. 8 therefore includes an alternative method for identifying (1006), to the aggregation process (502), disparate data sources that includes searching (1108), in dependence upon the data type information (1106), for a data source and identifying (1114), from search results (1112) returned in the data source search, sources of data corresponding to the data type (1116). Searching (1108), in dependence upon the data type information (1106), for a data source may be carried out by creating a search engine query in dependence upon the data type information and querying the search engine with the created query. Querying a search engine may be carried out through the use of URL encoded data passed to a search engine through, for example, an HTTP GET or HTTP POST function. URL encoded data is data packaged in a URL for data communications, in this case, passing a query to a search engine. In the case of HTTP communications, the HTTP GET and POST functions are often used to transmit URL encoded data. In this context, it is useful to remember that URLs do more than merely request file transfers. URLs identify resources on servers. Such resources may be files having filenames, but the resources identified by URLs also include, for example, queries to databases. Results of such queries do not necessarily reside in files, but they are nevertheless data resources identified by URLs and identified by a search engine and query data that produce such resources. An example of URL encoded data is:

http://www.example.com/search?field1=value1&field2=value2

This example of URL encoded data representing a query that is submitted over the web to a search engine. More specifically, the example above is a URL bearing encoded data representing a query to a search engine and the query is the string "field1=value1&field2=value2." The exemplary encoding method is to string field names and field values separated by '&' and "=" and designate the encoding as a query by including "search" in the URL. The exemplary URL encoded search query is for explanation and not for limitation. In fact, different search engines may use different syntax in representing a query in a data encoded URL and therefore the particular syntax of the data encoding may vary according to the particular search engine queried.

Identifying (1114), from search results (1112) returned in the data source search, sources of data corresponding to the data type (1116) may be carried out by retrieving URLs to data sources from hyperlinks in a search results page returned by the search engine.

Synthesizing Aggregated Data

As discussed above, data management and data rendering for disparate data types includes synthesizing aggregated data of disparate data types into data of a uniform data type. For further explanation, FIG. 9 sets forth a flow chart illustrating a method for synthesizing (414) aggregated data of disparate data types (412) into data of a uniform data type. As discussed above, aggregated data of disparate data types (412) is the accumulation, in a single location, of data of disparate types. This location of the aggregated data may be either physical, such as, for example, on a single computer containing aggregated data, or logical, such as, for example, a single interface providing access to the aggregated data. Also as discussed above, disparate data types are data of different kind and form. That is, disparate data types are data of different kinds. Data of a uniform data type is data having been created or translated into a format of predetermined type. That is, uniform data types are data of a single kind that may be rendered on a device capable of rendering data of the uniform data type. Synthesizing (414) aggregated data of disparate data types (412) into data of a uniform data type advantageously makes the content of the disparate data capable of being rendered on a single device.

Figure 9:
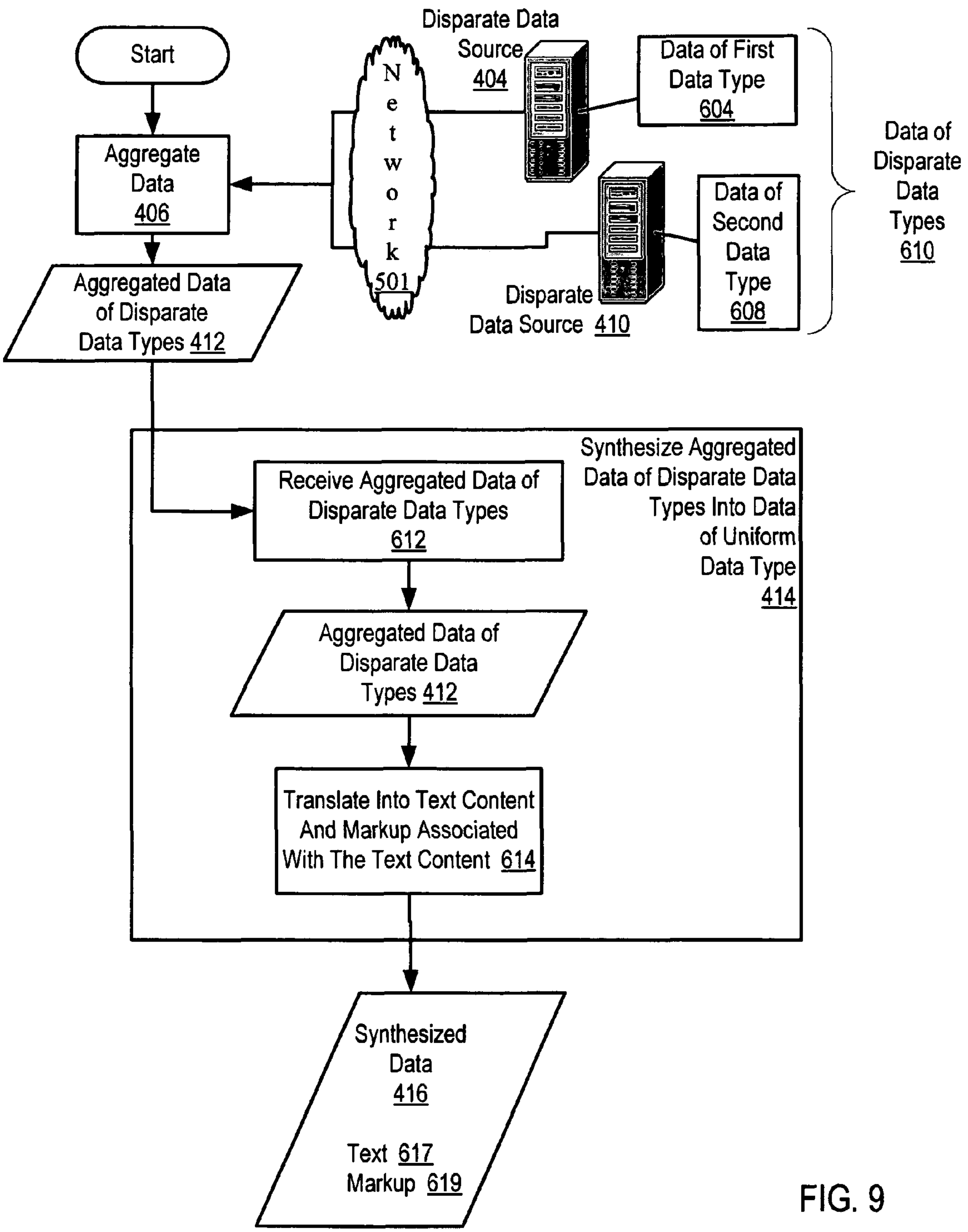
FIG. 9 sets forth a flow chart illustrating a exemplary method for synthesizing aggregated data of disparate data types into data of a uniform data type according to the present invention.

In the method of FIG. 9, synthesizing (414) aggregated data of disparate data types (412) into data of a uniform data type includes receiving (612) aggregated data of disparate data types. Receiving (612) aggregated data of disparate data types (412) may be carried out by receiving, from aggregation process having accumulated the disparate data, data of disparate data types from disparate sources for synthesizing into a uniform data type.

In the method for synthesizing of FIG. 9, synthesizing (414) the aggregated data (406) of disparate data types (610) into data of a uniform data type also includes translating (614) each of the aggregated data of disparate data types (610) into text (617) content and markup (619) associated with the text content. Translating (614) each of the aggregated data of disparate data types (610) into text (617) content and markup (619) associated with the text content according to the method of FIG. 9 includes representing in text and markup the content of the aggregated data such that a browser capable of rendering the text and markup may render from the translated data the same content contained in the aggregated data prior to being synthesized.

In the method of FIG. 9, translating (614) each of the aggregated data of disparate data types (610) into text (617) content and markup (619) may be carried out by creating an X+V document for the aggregated data including text, markup, grammars 5 and so on as will be discussed in more detail below with reference to FIG. 10. The use of X+V is for explanation and not for limitation. In fact, other markup languages may be useful in synthesizing (414) the aggregated data (406) of disparate data types (610) into data of a uniform data type according to the present invention such as XML, VXML, or any other markup language as will occur to those of skill in the art.

Translating (614) each of the aggregated data of disparate data types (610) into text (617) content and markup (619) such that a browser capable of rendering the text and markup may render from the translated data the same content contained in the aggregated data prior to being synthesized may include augmenting the content in translation in some way. That is, translating aggregated data types into text and markup may result in some modification to the content of the data or may result in deletion of some content that cannot be accurately translated. The quantity of such modification and deletion will vary according to the type of data being translated as well as other factors as will occur to those of skill in the art.

Translating (614) each of the aggregated data of disparate data types (610) into text (617) content and markup (619) associated with the text content may be carried out by translating the aggregated data into text and markup and parsing the translated content dependent upon data type. Parsing the translated content dependent upon data type means identifying the structure of the translated content and identifying aspects of the content itself, and creating markup (619) representing the identified structure and content.

Consider for further explanation the following markup language depiction of a snippet of audio clip describing the president.

```
<head> original file type= 'MP3' keyword = 'president' number = '50',
keyword = 'air force' number = '1' keyword = 'white house' number
='2' >
</head>
    <content>
        Some content about the president
    </content>
```

In the example above an MP3 audio file is translated into text and markup. The header in the example above identifies the translated data as having been translated from an MP3 audio file. The exemplary header also includes keywords included in the content of the translated document and the frequency with which those keywords appear. The exemplary translated data also includes content identified as 'some content about the president.'

As discussed above, one useful uniform data type for synthesized data is XHTML plus Voice. XHTML plus Voice ('X+V') is a Web markup language for developing multimodal applications, by enabling voice with voice markup. X+V provides voice-based interaction in devices using both voice and visual elements. Voice enabling the synthesized data for data management and data rendering according to embodiments of the present invention is typically carried out by creating grammar sets for the text content of the synthesized data. A grammar is a set of words that may be spoken, patterns in which those words may be spoken, or other language elements that define the speech recognized by a speech recognition engine. Such speech recognition engines are useful in a data management and rendering engine to provide users with voice navigation of and voice interaction with synthesized data.

Figure 10:
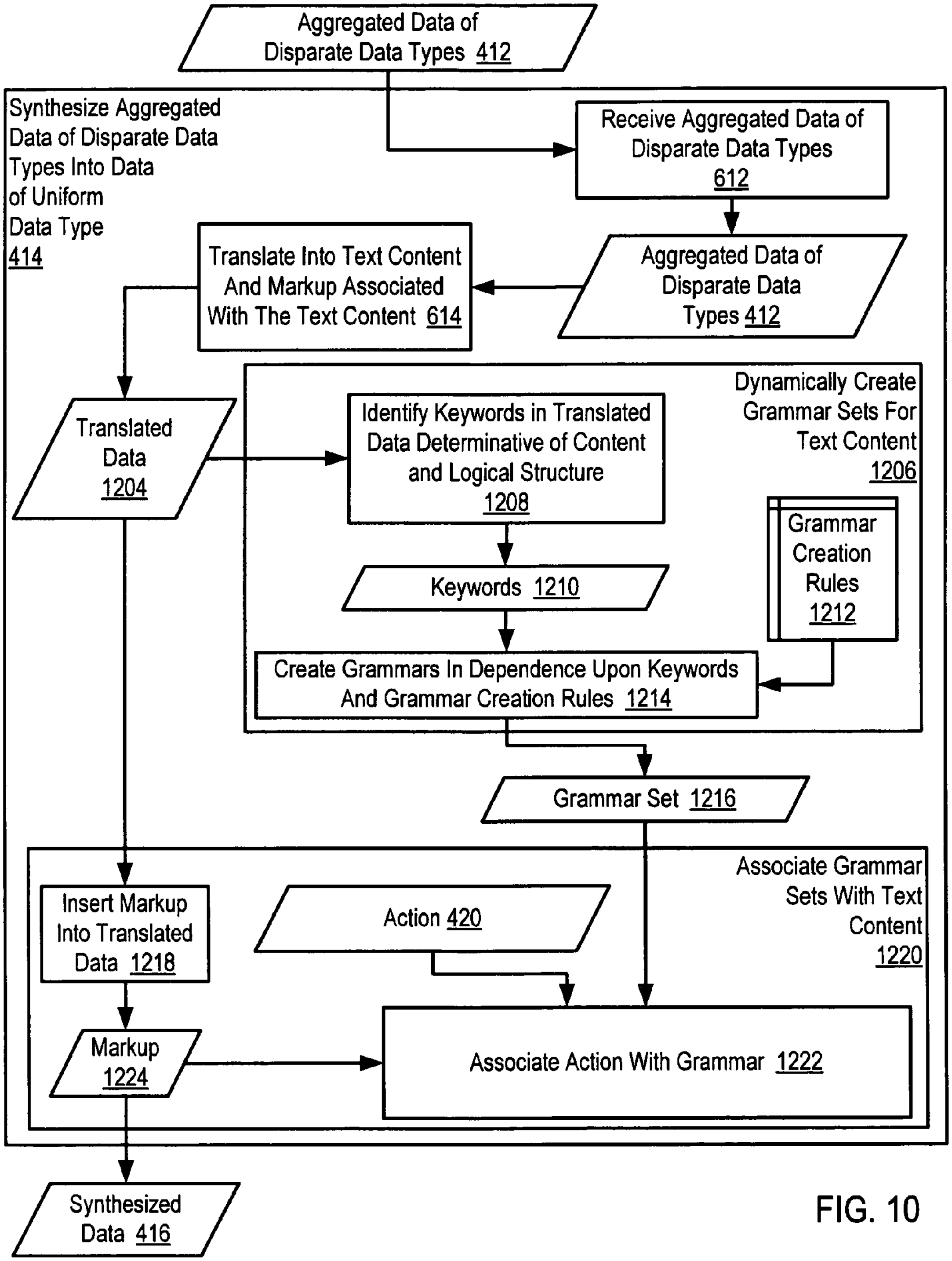
FIG. 10 sets forth a flow chart illustrating a exemplary method for synthesizing aggregated data of disparate data types into data of a uniform data type according to the present invention.

For further explanation, therefore, FIG. 10 sets forth a flow chart illustrating a method for synthesizing (414) aggregated data of disparate data types (412) into data of a uniform data type that includes dynamically creating grammar sets for the text content of synthesized data for voice interaction with a user. Synthesizing (414) aggregated data of disparate data types (412) into data of a uniform data type according to the method of FIG. 10 includes receiving (612) aggregated data of disparate data types (412). As discussed above, receiving (612) aggregated data of disparate data types (412) may be carried out by receiving, from aggregation process having accumulated the disparate data, data of disparate data types from disparate sources for synthesizing into a uniform data type.

The method of FIG. 10 for synthesizing (414) aggregated data of disparate data types (412) into data of a uniform data type also includes translating (614) each of the aggregated data of disparate data types (412) into translated data (1204) comprising text content and markup associated with the text content. As discussed above, translating (614) each of the aggregated data of disparate data types (412) into text content and markup associated with the text content includes representing in text and markup the content of the aggregated data such that a browser capable of rendering the text and markup may render from the translated data the same content contained in the aggregated data prior to being synthesized. In some cases, translating (614) the aggregated data of disparate data types (412) into text content and markup such that a browser capable of rendering the text and markup may include augmenting or deleting some of the content being translated in some way as will occur to those of skill in the art.

In the method of FIG. 10, translating (1202) each of the aggregated data of disparate data types (412) into translated data (1204) comprising text content and markup may be carried out by creating an X+V document for the synthesized data including text, markup, grammars and so on as will be discussed in more detail below. The use of X+V is for explanation and not for limitation. In fact, other markup languages may be useful in translating (614) each of the aggregated data of disparate data types (412) into translated data (1204) comprising text content and markup associated with the text content as will occur to those of skill in the art.

The method of FIG. 10 for synthesizing (414) aggregated data of disparate data types (412) into data of a uniform data type may include dynamically creating (1206) grammar sets (1216) for the text content. As discussed above, a grammar is a set of words that may be spoken, patterns in which those words may be spoken, or other language elements that define the speech recognized by a speech recognition engine In the method of FIG. 10, dynamically creating (1206) grammar sets (1216) for the text content also includes identifying (1208) keywords (1210) in the translated data (1204) determinative of content or logical structure and including the identified keywords in a grammar associated with the translated data. Keywords determinative of content are words and phrases defining the topics of the content of the data and the information presented the content of the data. Keywords determinative of logical structure are keywords that suggest the form in which information of the content of the data is presented. Examples of logical structure include typographic structure, hierarchical structure, relational structure, and other logical structures as will occur to those of skill in the art.

Identifying (1208) keywords (1210) in the translated data (1204) determinative of content may be carried out by searching the translated text for words that occur in a text more often than some predefined threshold. The frequency of the word exceeding the threshold indicates that the word is related to the content of the translated text because the predetermined threshold is established as a frequency of use not expected to occur by chance alone. Alternatively, a threshold may also be established as a function rather than a static value. In such cases, the threshold value for frequency of a word in the translated text may be established dynamically by use of a statistical test which compares the word frequencies in the translated text with expected frequencies derived statistically from a much larger corpus. Such a larger corpus acts as a reference for general language use.

Identifying (1208) keywords (1210) in the translated data (1204) determinative of logical structure may be carried out by searching the translated data for predefined words determinative of structure. Examples of such words determinative of logical structure include 'introduction,' 'table of contents,' 'chapter,' 'stanza,' 'index,' and many others as will occur to those of skill in the art.

In the method of FIG. 10, dynamically creating (1206) grammar sets (1216) for the text content also includes creating (1214) grammars in dependence upon the identified keywords (1210) and grammar creation rules (1212). Grammar creation rules are a pre-defined set of instructions and grammar form for the production of grammars. Creating (1214) grammars in dependence upon the identified keywords (1210) and grammar creation rules (1212) may be carried out by use of scripting frameworks such as JavaServer Pages, Active Server Pages, PHP, Perl, XML from translated data. Such dynamically created grammars may be stored externally and referenced, in for example, X+V the <grammar src=""/> tag that is used to reference external grammars.

The method of FIG. 10 for synthesizing (414) aggregated data of disparate data types (412) into data of a uniform data type includes associating (1220) the grammar sets (1216) with the text content. Associating (1220) the grammar sets (1216) with the text content includes inserting (1218) markup (1224) defining the created grammar into the translated data (1204). Inserting (1218) markup in the translated data (1204) may be carried out by creating markup defining the dynamically created grammar inserting the created markup into the translated document.

The method of FIG. 10 also includes associating (1222) an action (420) with the grammar. As discussed above, an action is a set of computer instructions that when executed carry out a predefined task. Associating (1222) an action (420) with the grammar thereby provides voice initiation of the action such that the associated action is invoked in response to the recognition of one or more words or phrases of the grammar.

Identifying an Action in Dependence Upon the Synthesized Data

Figure 11:
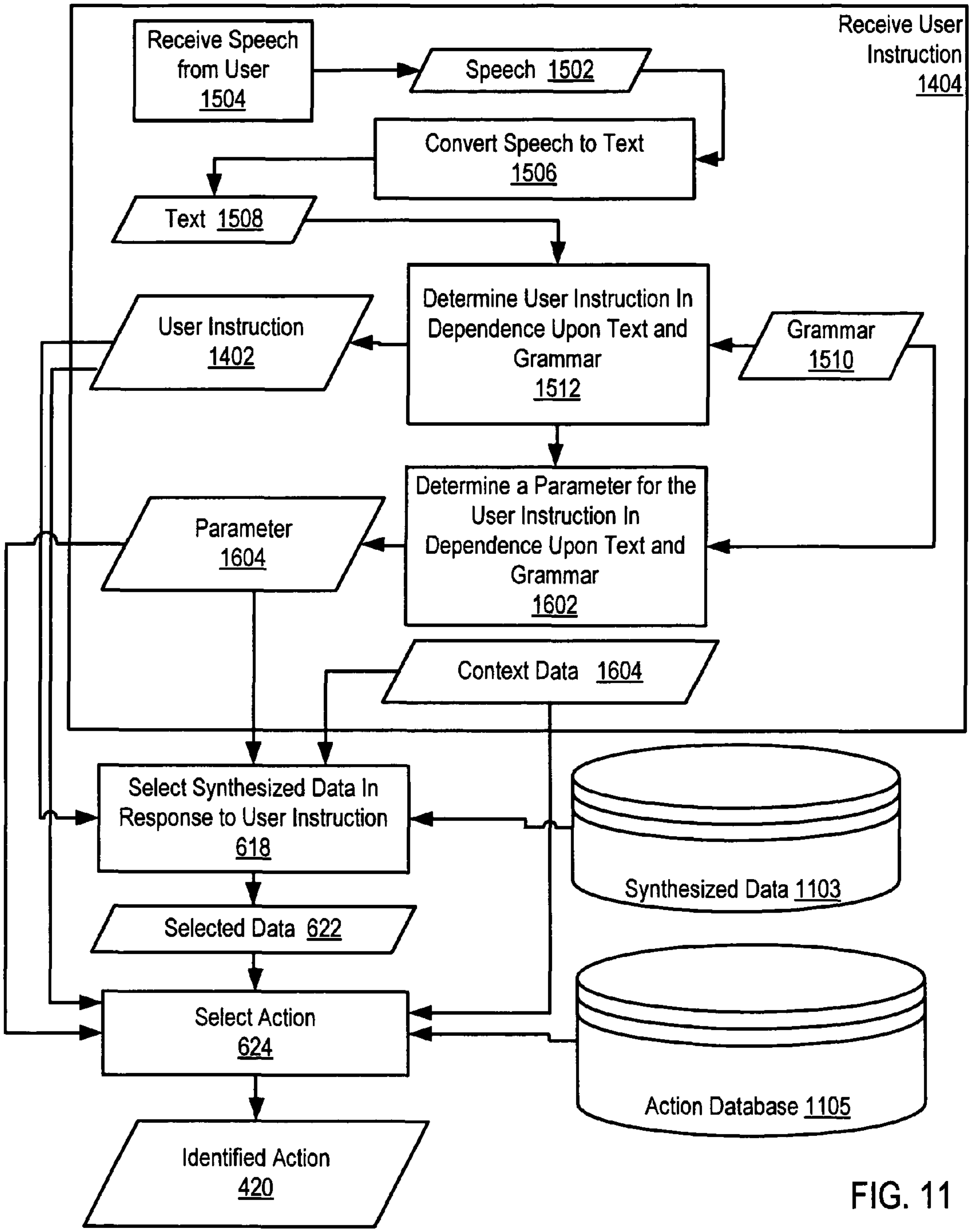
FIG. 11 sets forth a flow chart illustrating an exemplary method for identifying an action in dependence upon the synthesized data according to the present invention.

As discussed above, data management and data rendering for disparate data types includes identifying an action in dependence upon the synthesized data. For further explanation, FIG. 11 sets forth a flow chart illustrating an exemplary method for identifying an action in dependence upon the synthesized data (416) including receiving (616) a user instruction (620) and identifying an action in dependence upon the synthesized data (416) and the user instruction. In the method of FIG. 11, identifying an action may be carried out by retrieving an action ID from an action list. In the method of FIG. 11, retrieving an action ID from an action list includes retrieving from a list the identification of the action (the 'action ID') to be executed in dependence upon the user instruction and the synthesized data. The action list can be implemented, for example, as a Java list container, as a table in random access memory, as a SQL database table with storage on a hard drive or CD ROM, and in other ways as will occur to those of skill in the art. As mentioned above, the actions themselves comprise software, and so can be implemented as concrete action classes embodied, for example, in a Java package imported into a data management and data rendering module at compile time and therefore always available during run time.

In the method of FIG. 11, receiving (616) a user instruction (620) includes receiving (1504) speech (1502) from a user, converting (1506) the speech (1502) to text (1508); determining (1512) in dependence upon the text (1508) and a grammar (1510) the user instruction (620) and determining (1602) in dependence upon the text (1508) and a grammar (1510) a parameter (1604) for the user instruction (620). As discussed above with reference to FIG. 4, a user instruction is an event received in response to an act by a user. A parameter to a user instruction is additional data further defining the instruction. For example, a user instruction for 'delete email' may include the parameter 'Aug. 11, 2005' defining that the email of Aug. 11, 2005 is the synthesized data upon which the action invoked by the user instruction is to be performed. Receiving (1504) speech (1502) from a user, converting (1506) the speech (1502) to text (1508); determining (1512) in dependence upon the text (1508) and a grammar (1510) the user instruction (620); and determining (1602) in dependence upon the text (1508) and a grammar (1510) a parameter (1604) for the user instruction (620) may be carried out by a speech recognition engine incorporated into a data management and data rendering module according to the present invention.

Identifying an action in dependence upon the synthesized data (416) according to the method of FIG. 11 also includes selecting (618) synthesized data (416) in response to the user instruction (620). Selecting (618) synthesized data (416) in response to the user instruction (620) may be carried out by selecting synthesized data identified by the user instruction (620). Selecting (618) synthesized data (416) may also be carried out by selecting the synthesized data (416) in dependence upon a parameter (1604) of the user instruction (620).

Selecting (618) synthesized data (416) in response to the user instruction (620) may be carried out by selecting synthesized data context information (1802). Context information is data describing the context in which the user instruction is received such as, for example, state information of currently displayed synthesized data, time of day, day of week, system configuration, properties of the synthesized data, or other context information as will occur to those of skill in the art. Context information may be usefully used instead or in conjunction with parameters to the user instruction identified in the speech. For example, the context information identifying that synthesized data translated from an email document is currently being displayed may be used to supplement the speech user instruction 'delete email' to identify upon which synthesized data to perform the action for deleting an email.

Identifying an action in dependence upon the synthesized data (416) according to the method of FIG. 11 also includes selecting (624) an action (420) in dependence upon the user instruction (620) and the selected data (622). Selecting (624) an action (420) in dependence upon the user instruction (620) and the selected data (622) may be carried out by selecting an action identified by the user instruction. Selecting (624) an action (420) may also be carried out by selecting the action (420) in dependence upon a parameter (1604) of the user instructions (620) and by selecting the action (420) in dependence upon a context information (1802). In the example of FIG. 11, selecting (624) an action (420) is carried out by retrieving an action from an action database (1105) in dependence upon one or more a user instructions, parameters, or context information.

Executing the identified action may be carried out by use of a switch( ) statement in an action agent of a data management and data rendering module. Such a switch( ) statement can be operated in dependence upon the action ID and implemented, for example, as illustrated by the following segment of pseudocode:

```
switch (actionID) {
    Case 1: actionNumber1.take_action( ); break;
    Case 2: actionNumber2.take_action( ); break;
    Case 3: actionNumber3.take_action( ); break;
    Case 4: actionNumber4.take_action( ); break;
    Case 5: actionNumber5.take_action( ); break;
    // and so on
} // end switch( )
```

The exemplary switch statement selects an action to be performed on synthesized data for execution depending on the action ID. The tasks administered by the switcho in this example are concrete action classes named actionNumber1, actionNumber2, and so on, each having an executable member method named 'take_action( ),' which carries out the actual work implemented by each action class.

Executing an action may also be carried out in such embodiments by use of a hash table in an action agent of a data management and data rendering module. Such a hash table can store references to action object keyed by action ID, as shown in the following pseudocode example. This example begins by an action service's creating a hashtable of actions, references to objects of concrete action classes associated with a user instruction. In many embodiments it is an action service that creates such a hashtable, fills it with references to action objects pertinent to a particular user instruction, and returns a reference to the hashtable to a calling action agent.

```
Hashtable ActionHashTable = new Hashtable( );
ActionHashTable.put("1", new Action1( ));
ActionHashTable.put("2", new Action2( ));
ActionHashTable.put("3", new Action3( ));
```

Executing a particular action then can be carried out according to the following pseudocode:

```
Action anAction = (Action) ActionHashTable.get("2");
if (anAction != null) anAction.take_action( );
```

Executing an action may also be carried out by use of list. Lists often function similarly to hashtables. Executing a particular action, for example, can be carried out according to the following pseudocode:

```
List ActionList = new List( );
ActionList.add(1, new Action1( ));
ActionList.add(2, new Action2( ));
ActionList.add(3, new Action3( ));
```

Executing a particular action then can be carried out according to the following pseudocode:

```
Action anAction = (Action) ActionList.get(2);
if (anAction != null) anAction.take_action( );
```

The three examples above use switch statements, hash tables, and list objects to explain executing actions according to embodiments of the present invention. The use of switch statements, hash tables, and list objects in these examples are for explanation, not for limitation. In fact, there are many ways of executing actions according to embodiments of the present invention, as will occur to those of skill in the art, and all such ways are well within the scope of the present invention.

For further explanation of identifying an action in dependence upon the synthesized data consider the following example of user instruction that identifies an action, a parameter for the action, and the synthesized data upon which to perform the action. A user is currently viewing synthesized data translated from email and issues the following speech instruction: "Delete email dated Aug. 15, 2005." In the current example, identifying an action in dependence upon the synthesized data is carried out by selecting an action to delete and synthesized data in dependence upon the user instruction, by identifying a parameter for the delete email action identifying that only one email is to be deleted, and by selecting synthesized data translated from the email of Aug. 15, 2005 in response to the user instruction.

For further explanation of identifying an action in dependence upon the synthesized data consider the following example of user instruction that does not specifically identify the synthesized data upon which to perform an action. A user is currently viewing synthesized data translated from a series of emails and issues the following speech instruction: "Delete current email." In the current example, identifying an action in dependence upon the synthesized data is carried out by selecting an action to delete synthesized data in dependence upon the user instruction. Selecting synthesized data upon which to perform the action, however, in this example is carried out in dependence upon the following data selection rule that makes use of context information.

```
If synthesized data = displayed;
    Then synthesized data = 'current'.
If synthesized includes = email type code;
    Then synthesized data = email.
```

The exemplary data selection rule above identifies that if synthesized data is displayed then the displayed synthesized data is 'current' and if the synthesized data includes an email type code then the synthesized data is email. Context information is used to identify currently displayed synthesized data translated from an email and bearing an email type code. Applying the data selection rule to the exemplary user instruction "delete current email" therefore results in deleting currently displayed synthesized data having an email type code.

Channelizing the Synthesized Data

As discussed above, data management and data rendering for disparate data types often includes channelizing the synthesized data. Channelizing the synthesized data (416) advantageously results in the separation of synthesized data into logical channels. A channel implemented as a logical accumulation of synthesized data sharing common attributes having similar characteristics. Examples of such channels are 'entertainment channel' for synthesized data relating to entertainment, 'work channel' for synthesized data relating to work, 'family channel' for synthesized data relating to a user's family and so on.

Figure 12:
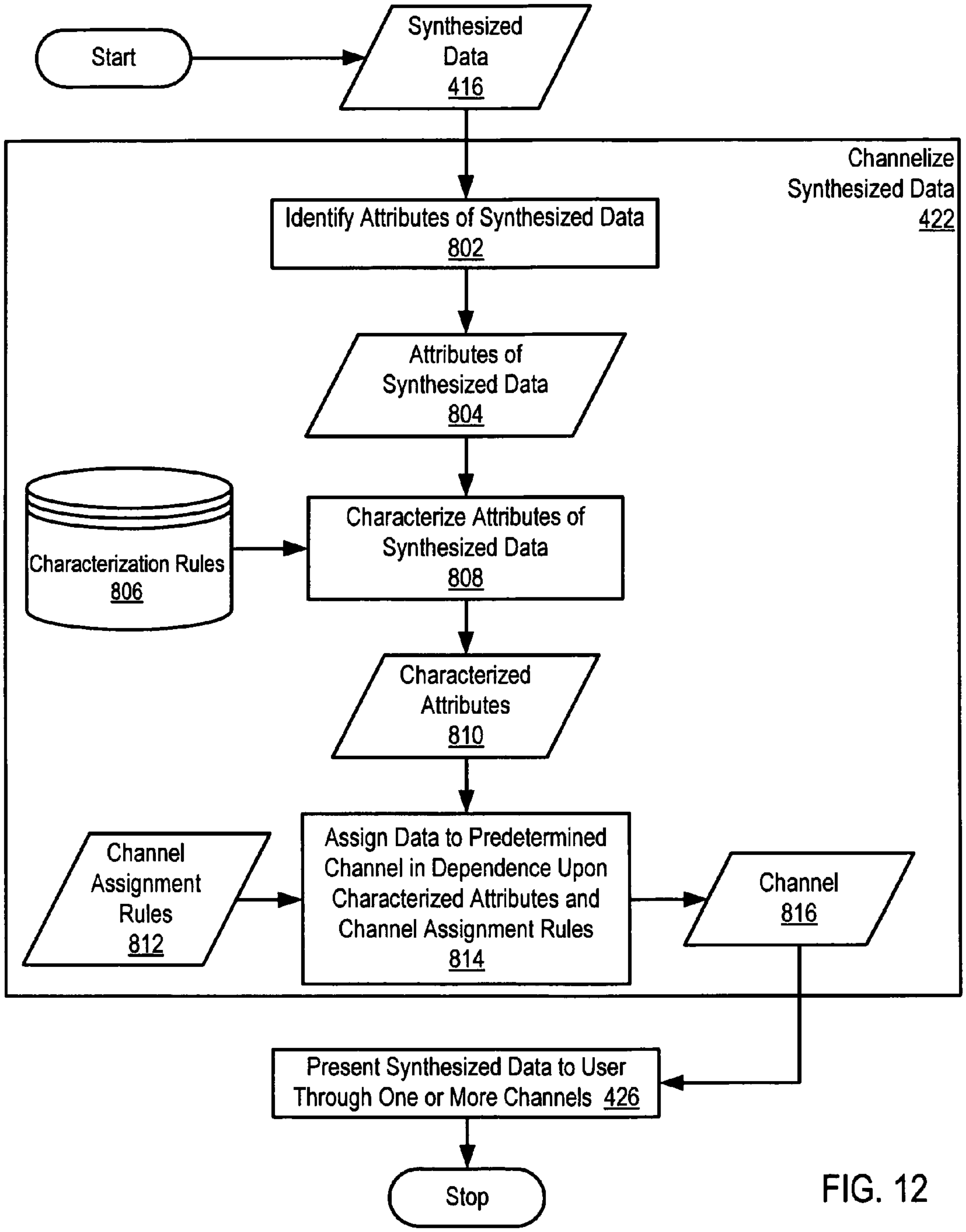
FIG. 12 sets forth a flow chart illustrating an exemplary method for channelizing the synthesized data according to embodiments of the present invention.

For further explanation, therefore, FIG. 12 sets forth a flow chart illustrating an exemplary method for channelizing (422) the synthesized data (416) according to embodiments of the present invention, which includes identifying (802) attributes of the synthesized data (804). Attributes of synthesized data (804) are aspects of the data which may be used to characterize the synthesized data (416). Exemplary attributes (804) include the type of the data, metadata present in the data, logical structure of the data, presence of particular keywords in the content of the data, the source of the data, the application that created the data, URL of the source, author, subject, date created, and so on. Identifying (802) attributes of the synthesized data (804) may be carried out by comparing contents of the synthesized data (804) with a list of predefined attributes. Another way that identifying (802) attributes of the synthesized data (804) may be carried out by comparing metadata associated with the synthesized data (804) with a list of predefined attributes.

The method of FIG. 12 for channelizing (422) the synthesized data (416) also includes characterizing (808) the attributes of the synthesized data (804). Characterizing (808) the attributes of the synthesized data (804) may be carried out by evaluating the identified attributes of the synthesized data. Evaluating the identified attributes of the synthesized data may include applying a characterization rule (806) to an identified attribute. For further explanation consider the following characterization rule:

```
If synthesized data = email; AND
If email to = "Joe"; AND
If email from = "Bob";
    Then email = 'work email.'
```

In the example above, the characterization rule dictates that if synthesized data is an email and if the email was sent to "Joe" and if the email sent from "Bob" then the exemplary email is characterized as a 'work email.'

Characterizing (808) the attributes of the synthesized data (804) may further be carried out by creating, for each attribute identified, a characteristic tag representing a characterization for the identified attribute. Consider for further explanation the following example of synthesized data translated from an email having inserted within it a characteristic tag.

```
<head >
original message type = 'email' to = 'joe' from = 'bob' re = 'I will be late
tomorrow'</head>
    <characteristic>
        characteristic = 'work'
    <characteristic>
    <body>
        Some body content
    </body>
```

In the example above, the synthesized data is translated from an email sent to Joe from 'Bob' having a subject line including the text 'I will be late tomorrow. In the example above <characteristic> tags identify a characteristic field having the value 'work' characterizing the email as work related. Characteristic tags aid in channelizing synthesized data by identifying characteristics of the data useful in channelizing the data.

The method of FIG. 12 for channelizing (422) the synthesized data (416) also includes assigning (814) the data to a predetermined channel (816) in dependence upon the characterized attributes (810) and channel assignment rules (812). Channel assignment rules (812) are predetermined instructions for assigning synthesized data (416) into a channel in dependence upon characterized attributes (810). Consider for further explanation the following channel assignment rule:

```
If synthesized data = 'email'; and
If Characterization = 'work related email'
```

Then channel='work channel.'

In the example above, if the synthesized data is translated from an email and if the email has been characterized as 'work related email' then the synthesized data is assigned to a 'work channel.'

Assigning (814) the data to a predetermined channel (816) may also be carried out in dependence upon user preferences, and other factors as will occur to those of skill in the art. User preferences are a collection of user choices as to configuration, often kept in a data structure isolated from business logic. User preferences provide additional granularity for channelizing synthesized data according to the present invention.

Under some channel assignment rules (812), synthesized data (416) may be assigned to more than one channel (816). That is, the same synthesized data may in fact be applicable to more than one channel. Assigning (814) the data to a predetermined channel (816) may therefore be carried out more than once for a single portion of synthesized data.

The method of FIG. 12 for channelizing (422) the synthesized data (416) may also include presenting (426) the synthesized data (416) to a user through one or more channels (816). One way presenting (426) the synthesized data (416) to a user through one or more channels (816) may be carried out is by presenting summaries or headings of available channels in a user interface allowing a user access to the content of those channels. These channels could be accessed via this presentation in order to access the synthesized data (416). The synthesized data is additionally to the user through the selected channels by displaying or playing the synthesized data (416) contained in the channel.

Dynamic Prosody Adjustment for Voice-Rendering Synthesized Data

As discussed above, actions are often identified and executed in dependence upon the synthesized data. One such action useful in data management and data rendering for disparate data types includes presenting the synthesized data to a user. Presenting synthesized data to a user may be carried out by voice-rendering synthesized data, which advantageously results in improved user access to the synthesized data. Voice rendering the synthesized data allows the user improved flexibility in accessing the synthesized data often in circumstances where visual methods of accessing the data may be cumbersome. Examples of circumstances where visual methods of accessing the data may be cumbersome include working in crowded or uncomfortable locations such as trains or cars, engaging in visually intensive activities such as walking or driving, and other circumstances as will occur to those of skill in the art.

Figure 13:
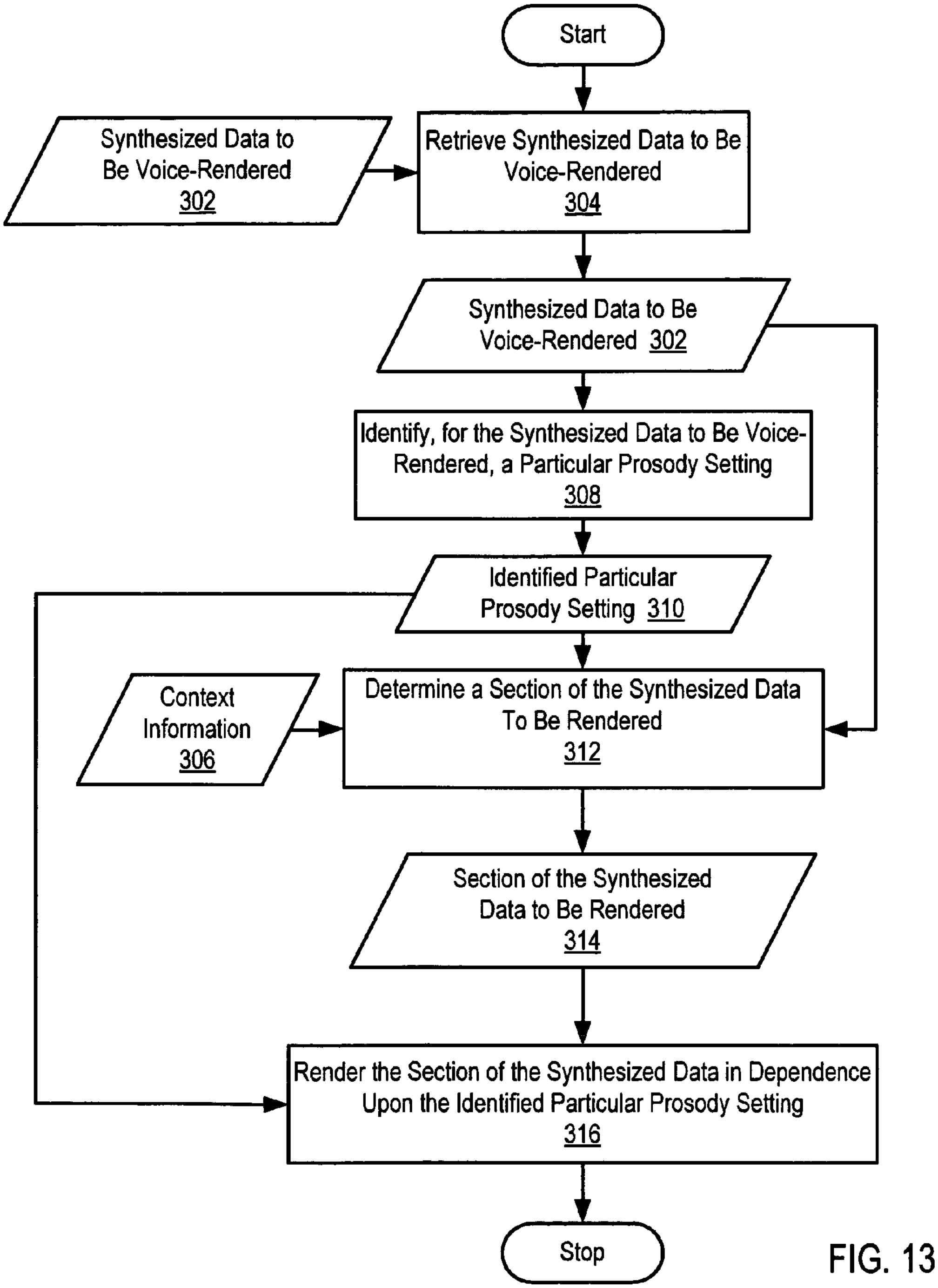
FIG. 13 sets forth a flow chart illustrating an exemplary method for voice-rendering synthesized data according to embodiments of the present invention.

For further explanation, therefore, FIG. 13 sets forth a flow chart illustrating an exemplary method for voice-rendering synthesized data, which includes retrieving synthesized data to be voice rendered. Retrieving (304) synthesized data to be voice rendered (302) according the method of FIG. 13 may be carried out by retrieving synthesized data from local memory, such as, for example, retrieving synthesized data from a synthesized data repository, as discussed above in reference to FIG. 3. A synthesized data repository is data storage for synthesized data.

The synthesized data to be voice rendered (302) is aggregated data from disparate data sources which has been synthesized into synthesized data. The uniform format of the synthesized data is typically a format designed to enable voice rendering, such as, for example, XHTML plus Voice ('X+V') format. As discussed above, X+V is a Web markup language for developing multimodal applications by enabling voice in a presentation layer with voice markup. X+V is composed of three main standards: XHTML, VoiceXML, and XML Events.

The exemplary method of FIG. 13 for voice-rendering synthesized data also includes identifying (308), for the synthesized data to be voice rendered (302), a particular prosody setting. A prosody setting is a collection of one or more individual settings governing distinctive speech characteristics implemented by a voice engine such as variations of stress of syllables, intonation, timing in spoken language, variations in pitch from word to word, the rate of speech, the loudness of speech, the duration of pauses, and other distinctive speech characteristics as will occur to those of skill in the art. Prosody settings may be implemented as text and markup in the synthesized data to be rendered, as settings in a configurations file, or in any other way as will occur to those of skill in the art. Prosody settings implemented as text and markup are typically implemented in a speech synthesis markup language according to standards promulgated for such languages, such as, for example, the Speech Synthesis Markup Language ('SSML') promulgated by the World Wide Web Consortium, Java Speech API Markup Language Specification ('JSML'), and other standards as will occur to those of skill in the art. Typically prosody settings are composed of individual speech attributes, but prosody settings may also be selected as a named collection of individual speech attributes known as a voice. Speech synthesis engines which support speech synthesis markup languages often provide generic voices which mimic voice types based on gender and age. Such speech synthesis engines also typically support the creation of customized voices. Speech synthesis engines voice render text according to prosody settings as described above. Examples of such speech synthesis engines include, for example, IBM's ViaVoice Text-to-Speech, Acapela Multimedia TTS, AT&T Natural Voices™ Text-to-Speech Engine, and other speech synthesis engines as will occur to those of skill in the art.

Identifying (308) a particular prosody setting may be carried out in a number of ways. Identifying (308) a particular prosody setting, for example, may be carried out by retrieving a prosody identification from the synthesized data to be voice rendered (302); identifying a particular prosody in dependence upon a user instruction; selecting the particular prosody setting in dependence upon a user prosody history; and determining current voice characteristics of the user and selecting the particular prosody setting in dependence upon the current voice characteristics of the user. Each of the delineated methods above for identifying (308), for the synthesized data to be voice rendered (302), a particular prosody setting are discussed in greater detail below with reference to FIGS. 14A-14D.

The method of FIG. 13 for voice-rendering synthesized data also includes determining (312), in dependence upon the synthesized data to be voice rendered (302) and context information (306), a section of the synthesized data to be rendered (314). A section of synthesized data is any fraction or subelement of synthesized data up to and including the whole of the synthesized data, including, for example, an individual synthesized email in synthesized data; the first two lines of an RSS feed in synthesized data; an individual item from an RSS feed in synthesized data; the two sentences in an individual item from an RSS feed which contain keywords; the first fifty words of a calendar description; the first 50 characters of the "To:," "From:," "Subject:", and "Body" sections of each synthesized email in synthesized data; all data in a channel (as described above with reference to FIG. 12); and any other section of synthesized data as will occur to those of skill in the art.

Context information (306) is data describing the context in which synthesized data is to be voice rendered such as, for example, state information of currently displayed synthesized data, time of day, day of week, system configuration, properties of the synthesized data, or other context information (306) as will occur to those of skill in the art. Context information (306) is often used to determine a section of the synthesized data to be rendered (314). For example, the context information describing the context of a laptop identifies that the cover to a laptop is currently closed. This context information may be used to determine a section of synthesized data to be voice rendered that suits the current context. Such a section may include, for example, only the "From:" line and content of each synthesized email in the synthesized data, as opposed to the entire synthesized email including the "To:" line, the "From:" line, the "Subject:" line, the "Date Received:" line, the "Priority:" line, and content if the laptop cover is open.

Figure 15:
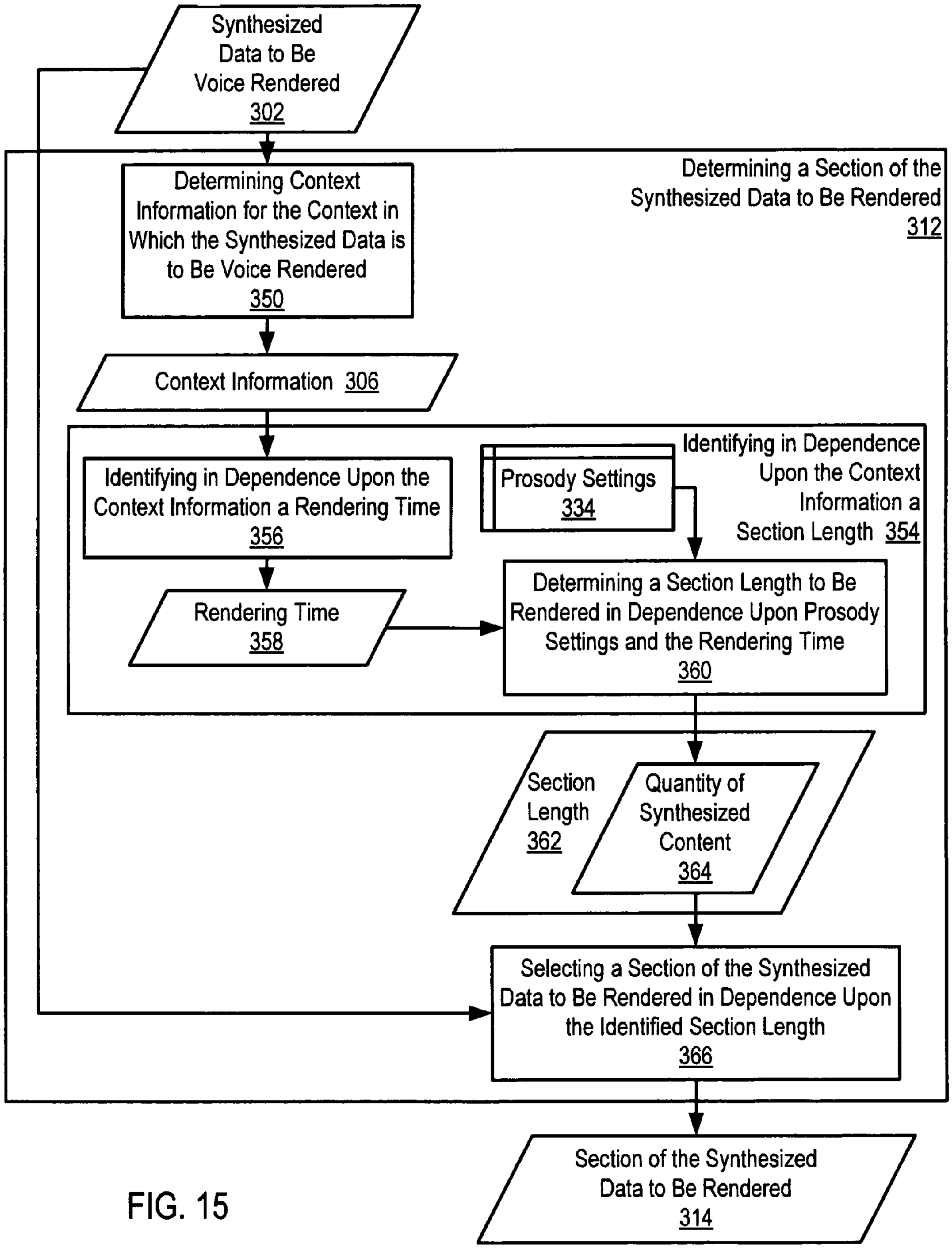
FIG. 15 sets forth a flow chart illustrating an exemplary method for determining, in dependence upon the synthesized data to be voice rendered and the context information for the context in which the synthesized data is to be voice rendered, a section of the synthesized data to be rendered according to embodiments of the present invention.

Determining (312), in dependence upon the synthesized data to be voice rendered (302) and context information (306), a section of the synthesized data to be rendered (314) may include, for example, determining the context information (306) in which the synthesized data is to be voice rendered; identifying, in dependence upon the context information (306), a section length; and selecting a section of the synthesized data to be rendered in dependence upon the identified section length, as will be discussed in greater detail below in reference to FIG. 15.

The method of FIG. 13 for voice-rendering synthesized data also includes rendering (316) the section of the synthesized data (314) in dependence upon the identified particular prosody settings (310). Rendering (316) the section of the synthesized data (314) in dependence upon the identified particular prosody settings (310) may be carried out by playing as speech the content of the section of synthesized data according to the particular identified prosody setting. Such a section may be presented to a particular user in a manner tailored for the section being rendered and the context in which the section is rendered.

As discussed above, voice-rendering synthesized data often includes identifying (308), for the synthesized data to be voice rendered (302), a particular prosody setting. A prosody setting is a collection one or more individual settings governing distinctive speech characteristics implemented by a voice engine such as variations of stress of syllables, intonation, timing in spoken language, variations in pitch from word to word, the rate of speech, the loudness of speech, the duration of pauses, and other distinctive speech characteristics as will occur to those of skill in the art.

Figure 14A:
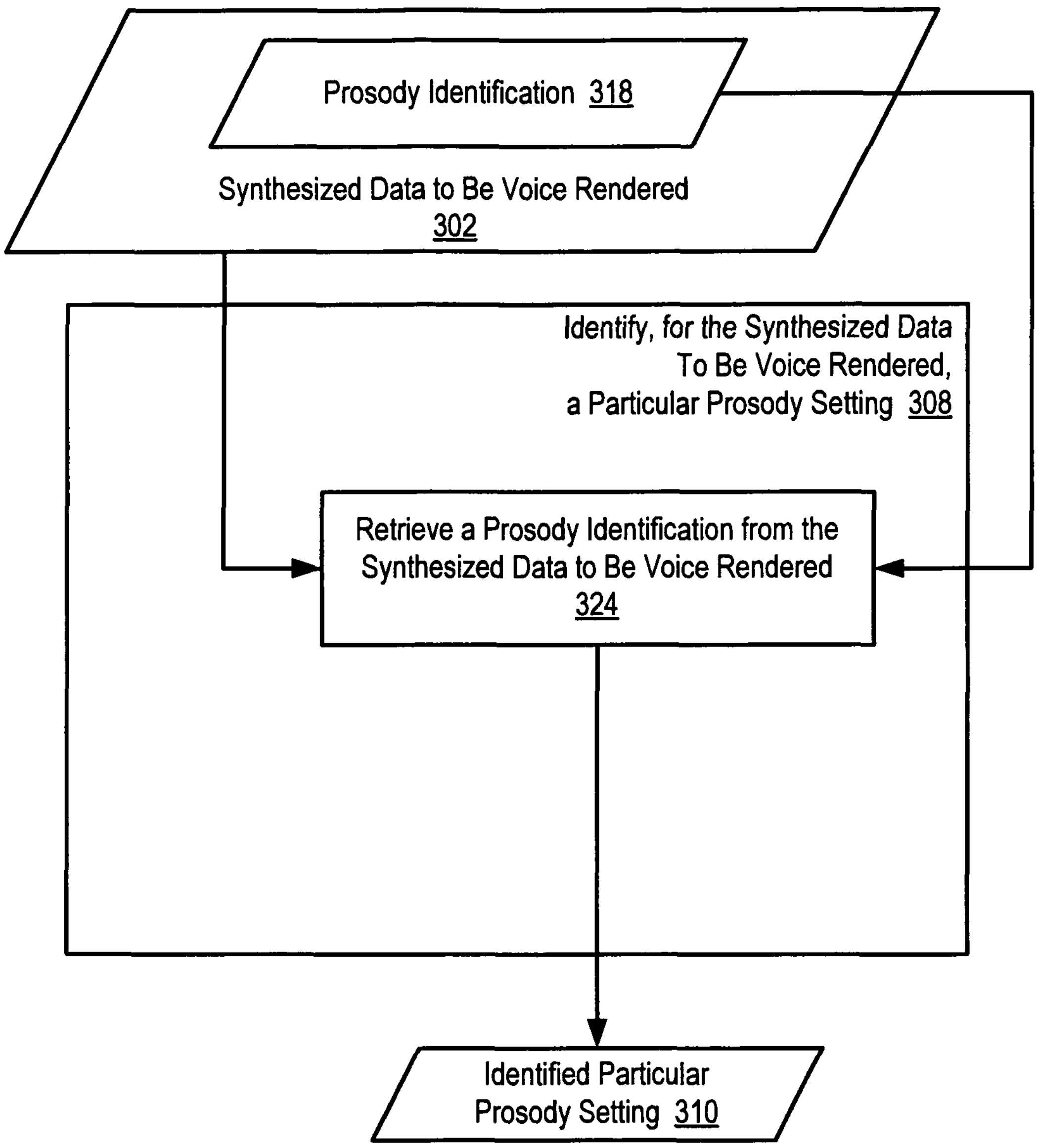
FIG. 14A sets forth a flow chart illustrating an alternative exemplary method for identifying a particular prosody setting according to embodiments of the present invention.

For further explanation, therefore, FIGS. 14A-14D set forth flow charts illustrating four alternative exemplary methods for identifying (308), for the synthesized data to be voice rendered (302), a particular prosody setting. In the method of FIG. 14A, identifying (308), for the synthesized data to be voice rendered (302), a particular prosody setting includes retrieving (324) a prosody identification (318) from the synthesized data to be voice rendered (302). Such a prosody identification (318) may include designations of individual speech attributes used in rendering synthesized data, designations of the voice to be emulated in voice rendering the synthesized data, designations of any combination of voice and individual speech attributes, or any other prosody identification (318) as will occur to those of skill in the art. Examples of individual speech attributes include rate, volume, pitch, range, and other individual speech attributes as will occur to those of skill in the art.

Synthesized data may contain text and markup for designating prosody identification often including individual speech attributes. For example, the VoiceXML 2.0 format, a version of VXML which partly comprises the X+V format, supports designation of individual speech attributes under a prosody element. The prosody element is denoted by the markup tags <prosody> and </prosody>, and individual speech attributes such as contour, duration, pitch, range, rate, and volume may be designated by including the attribute name and the corresponding value in the <prosody> tag. Other individualized speech attributes included in the prosody identification (318) but not denoted by the <prosody> tag are also supported in the VoiceXML 2.0 format, such as, for example, an emphasis attribute, denoted by an <emphasis> and an </emphasis> markup tag, which denotes that text should be rendered with emphasis.

Consider for further illustration the following pseudocode example of voice-enabled synthesized data containing text and markup to enable voice rendering of the synthesized data according to a particular prosody:

```
<head>
<title>Top Stories</title>
      <block>
      <prosody rate="slow" volume="loud" >
      Top Stories.
      </prosody>
      </block>
</head>
<body>
<h1>World is Round</h1>
<p>Scientists discovered today that the Earth is round, not flat.</p>
      <block>
      <prosody rate="medium">
      Scientists discovered today that the Earth is round, not flat.
      </prosody>
      </block>
</body>
```

In the exemplary voice-enabled synthesized data above, the text "Top Stories" is denoted as a title, by its inclusion between the <title> and </title> markup tags. The same text is voice enabled by including it again between the <block> and </block> markup tags. When rendered with a voice-enabled browser, the text, 'Top Stories,' will be voice rendered into simulated speech. Individual speech attributes are designated for the text to be voice rendered by the use of the prosody element. The text to be affected, 'Top Stories,' is placed between the markup tags <prosody 20 rate="slow" volume="loud"> and </prosody>. The individual speech attributes of a slow rate and a loud volume are designated by the inclusion of the phrases 'rate="slow"' and 'volume="loud"' in the markup tag <prosody rate="slow" volume="loud">. The designation of the individual speech attributes, 'rate="slow"' 'volume="loud,"' will result in the text 'Top Stories' being rendered at a slow rate of speech and a loud volume.

In the next section of the example above, the text 'World is Round' is denoted as a heading, by its inclusion between the <h1> and </h1> markup tags. This text is not voice enabled.

In the next section of the example above, the text 'Scientists discovered today that the Earth is round, not flat.' is denoted as a paragraph, by its inclusion between the <p> and </p> markup tags. The same text is voice enabled by including it again between the <block> and </block> markup tags. When rendered with a voice-enabled browser, the text, 'Scientists discovered today that the Earth is round, not flat.' will be voice rendered into simulated speech. An individual speech attribute is designated for the text to be voice rendered by the use of the prosody element. The text to be affected, 'Scientists discovered today that the Earth is round, not flat.' is placed between the markup tags <prosody rate="medium"> and </prosody>. The individual speech attribute of a medium rate is designated by the inclusion of the phrase 'rate="medium"' contained in the markup tag <prosody rate="medium">. The designation of the individual speech attribute, 'rate="medium,"' will result in the text, 'Scientists discovered today that the Earth is round, not flat.' being rendered at a medium rate of speech.

As indicated above, a prosody identification (318) may also include designations of a voice to be emulated in voice rendering the synthesized data. Designations of the voice are designations of a collection of individual speech attributes packaged together as a 'voice' to simulate the designated voice. Designations of the voice may include designations of gender or age to be emulated in voice rendering the synthesized data, designations of variants of a gender or age designation, designations of variants of a combination of gender and age, and designations by name of a pre-defined group of individual attributes.

Synthesized data may contain text and markup for designating a voice to be emulated in voice rendering the synthesized data. For example, the Java Speech API Markup Language ('JSML') supports designation of a voice to be emulated in voice rendering the synthesized data under its voice element. JSML is an XML-based application which defines a specific set of elements to markup text to be spoken, and defines the interpretation of those elements so as to enable voice rendering of documents. The JSML element set includes the voice element, which is denoted by the tags <voice> and </voice>. Designating a voice to be emulated in voice rendering the synthesized data is carried out by including voice attributes such as 'gender' and 'age,' as well as voice naming attributes such as 'variant,' and 'name,' and the corresponding value in the <voice> tag.

Consider for further illustration the following pseudocode example of voice-enabled synthesized data containing text and markup to enable voice rendering of the synthesized data:

```
<item>
<title>Top Stories</title>
    <block>
    <voice gender="male" age="older_adult" name="Roy" >
    Top Stories.
    </voice>
    </block>
</item>
<item>
<title>Sports</title>
    <block>
    <voice gender="male" volume="middle-age_adult" >
    Sports.
    </voice>
    </block>
</item>
<item>
<title>Entertainment</title>
    <block>
    <voice gender="female" age="30"> Entertainment.
    </voice>
    </block>
</item>
```

In the exemplary voice-enabled synthesized data above, three items from an RSS form feed are denoted by use of the markup tags <item> and </item>. In the first item, the text 'Top Stories' is denoted as a title, by its inclusion between the <title> and </title> markup tags. The same text is voice enabled by including it again between the <block> and </block> markup tags. When rendered with a voice-enabled browser, the text, 'Top Stories,' is voice rendered into simulated speech. A voice is designated for the text to be voice rendered by the use of the voice element. The text to be affected, 'Top Stories,' is placed between the markup tags <voice gender="male" age="older_adult" name="Roy"> and </voice>. The voice of an older adult male is designated by the inclusion of the phrases 'gender="male"' and 'age="older_adult"' contained in the markup tag <voice gender="male" age="older_adult" name="Roy">. The designation of the voice of an older adult male will result in the text 'Top Stories' being rendered using pre-defined individual speech attributes of an older adult male. The phrase 'name="Roy"' included in the markup tag <voice gender="male" age="older_adult" name="Roy"> names the voice setting for later use.

In the next item, the text 'Sports' is denoted as a title, by its inclusion between the <title> and </title> markup tags. The same text is voice enabled by including it again between the <block> and </block> markup tags. When rendered with a voice-enabled browser, the text, 'Sports,' will be voice rendered into simulated speech. A voice is designated for the text to be voice rendered by the use of the voice element. The text to be affected, 'Sports,' is placed between the markup tags <voice gender="male" age="middle-age_adult"> and </voice>. The voice of a middle-age adult male is designated by the inclusion of the phrases 'gender="male"' and age="middle-age_adult"' contained in the markup tag <voice gender="male" age="middle-age_adult">. The designation of the voice of a middle-age adult male will result in the text 'Sports' being rendered using pre-defined individual speech attributes of a middle-age adult male.

In the final item of the example above, the text 'Entertainment' is denoted as a title, by its inclusion between the <title> and </title> markup tags. The same text is voice enabled by including it again between the <block> and </block> markup tags. When rendered with a voice-enabled browser, the text, 'Entertainment,' will be voice rendered into simulated speech. A voice is designated for the text to be voice rendered by the use of the voice element. The text to be affected, 'Entertainment,' is placed between the markup tags <voice gender="female" age="30"> and </voice>. The voice of a thirty-year-old female is designated by the inclusion of the phrases 'gender="female"' and 'age="30"' contained in the markup tag <voice gender="female" age="30">. The designation of the voice of a thirty-year-old female will result in the text 'Entertainment' being rendered using pre-defined individual speech attributes of a thirty-year-old female.

Figure 14B:
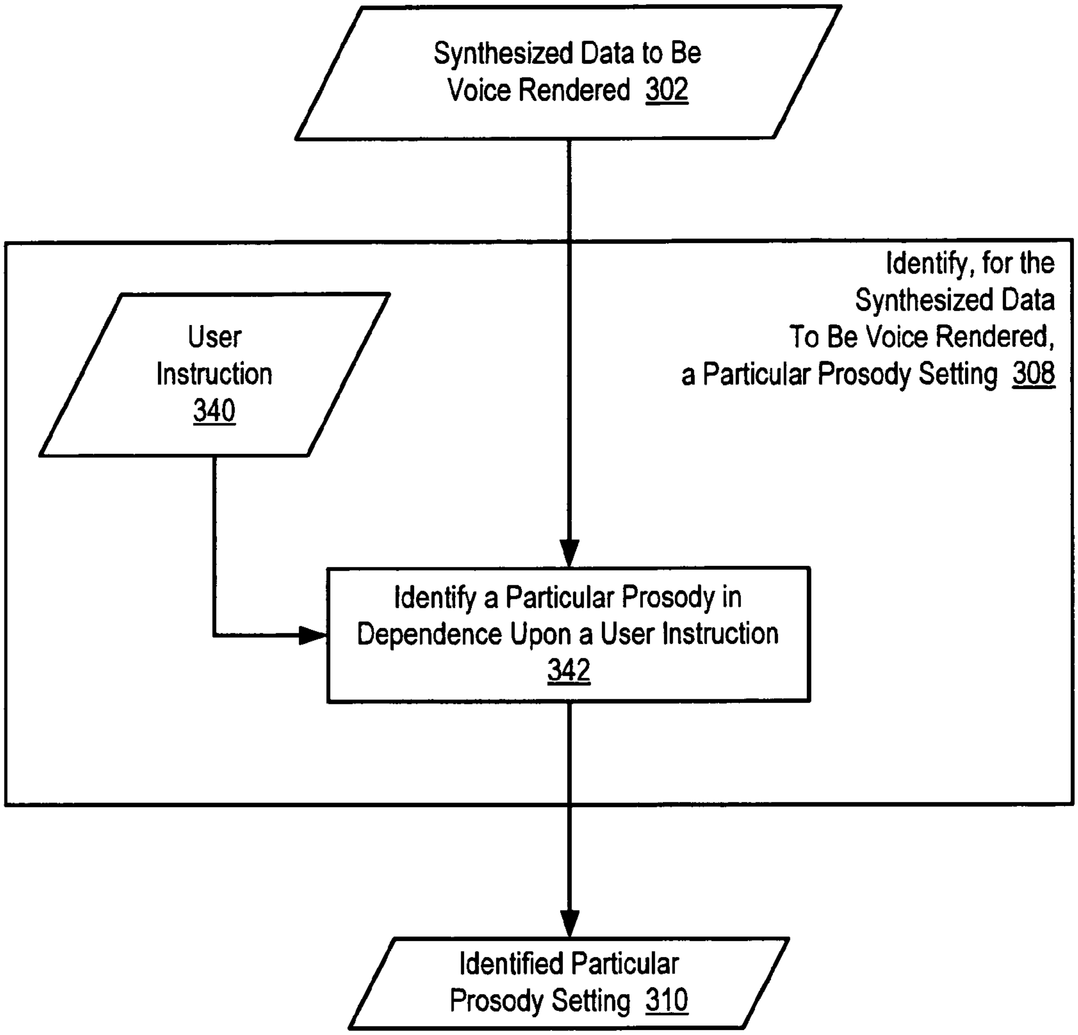
FIG. 14B sets forth a flow chart illustrating an alternative exemplary method for identifying a particular prosody setting according to embodiments of the present invention.

Turning now to FIG. 14B, FIG. 14B sets forth a flow chart illustrating another exemplary method for identifying (308) a particular prosody setting for voice rendering the synthesized data. In the method of FIG. 14B, identifying (308) a particular prosody setting includes identifying (342) a particular prosody in dependence upon a user instruction (340). A user instruction is an event received in response to an act by a user. Exemplary user instructions include receiving an event as a result of a user entering a combination of keystrokes using a keyboard or keypad, receiving an event as a result of speech from a user, receiving an event as a result of clicking on icons on a visual display by using a mouse, receiving an event as a result of a user pressing an icon on a touchpad, or other user instructions as will occur to those of skill in the art.

Identifying (342) a particular prosody in dependence upon a user instruction (340) may be carried out by receiving a user instruction, identifying a particular prosody setting from the user instruction (340), and effecting the particular prosody setting when the synthesized data is rendered. For example, the phrase 'read fast,' when spoken aloud by a user during voice rendering of synthesized data, may be received and compared against grammars to interpret the user instruction. The matching grammar may have an associated action that when invoked establishes in the voice engine a particular prosody setting, 'fast,' instructing the voice engine to render synthesized data at a rapid rate.

Figure 14C:
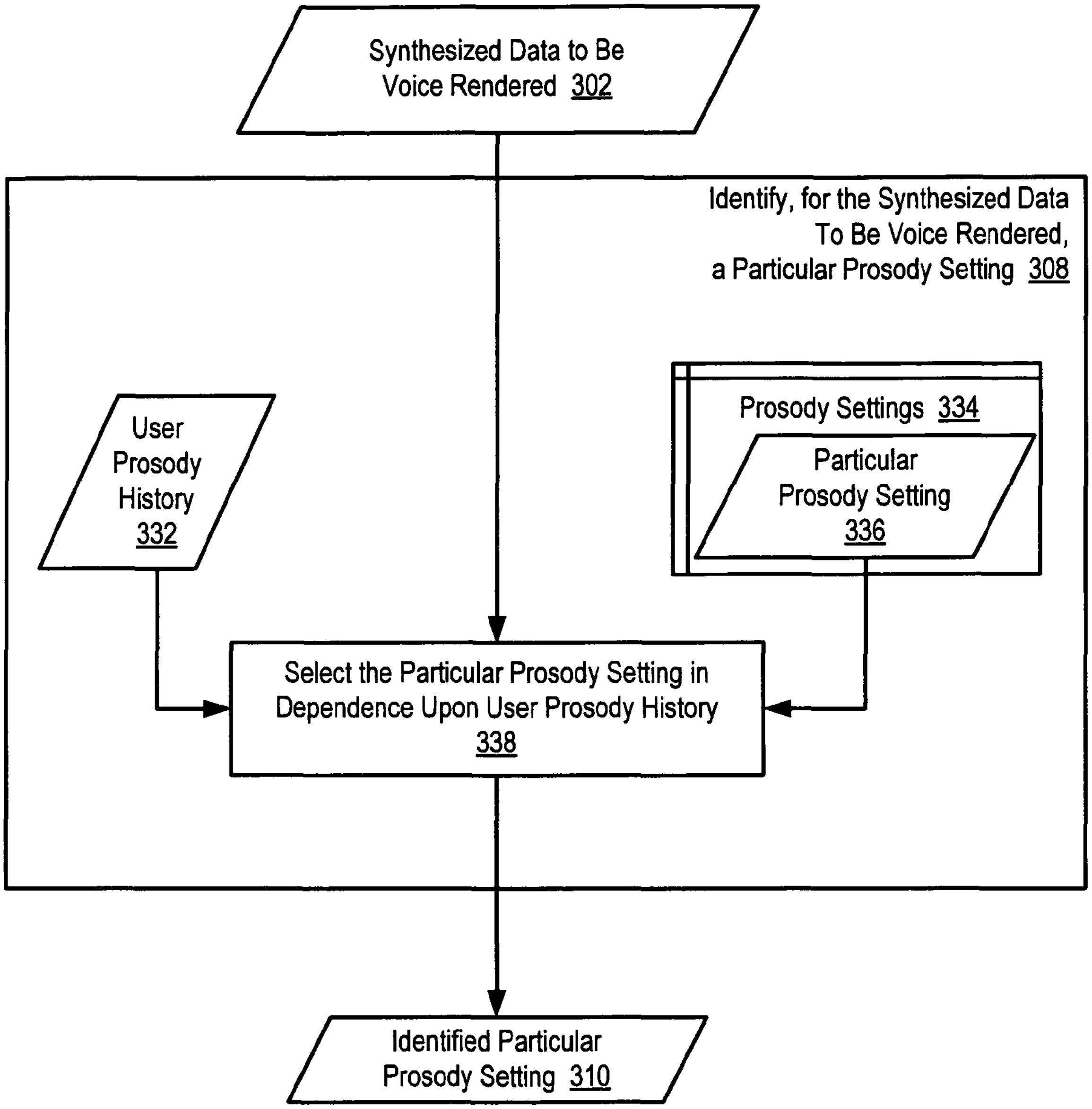
FIG. 14C sets forth a flow chart illustrating an alternative exemplary method for identifying a particular prosody setting according to embodiments of the present invention.

Turning now to FIG. 14C, FIG. 14C sets forth a flow chart illustrating another exemplary method for identifying (308) a particular prosody setting for voice rendering the synthesized data. In the method of FIG. 14C, identifying (308) a particular prosody setting also includes selecting (338) the particular prosody setting (336) in dependence upon user prosody history (332). User prosody history (332) is typically implemented as a data structure including entries representing different prosody settings used in voice-rendering synthesized data for a user and the context in which the different prosody settings were used. The context in which the different prosody settings were used includes the circumstances surrounding the use of different prosody settings for voice-rendering synthesized data, such as, for example, time of day, day of the week, day of the year, the native data type of the synthesized data being voice rendered, and so on.

A user prosody history is useful in selecting a prosody setting in the absence of a prior designation for a prosody setting for the section of synthesized data. Selecting (338) the particular prosody setting (336) in dependence upon user prosody history (332) may be carried out, therefore, by identifying the most used prosody setting in the user prosody history (332) and applying the most used prosody setting as a default prosody setting in voice rendering the synthesized data when no other prosody setting has been selected for the synthesized data.

Consider for further illustration the following example of identifying a particular prosody setting for use in voice-rendering synthesized data where there exist no prosody settings:

```
IF ProsodySetting = none;
AND MostUsedProsodySettingInProsodyHistory = rate medium;
THEN Render(Synthesized Data) = rate medium.
```

In the example above, no prosody setting exists for rendering synthesized data. A user prosody history which records the use of prosody settings indicates that the most-used prosody setting is currently the prosody setting of a medium rate of speech. Because no prosody settings exist for voice-rendering synthesized data, then the most-used prosody setting from a user prosody history, a medium rate of speech, is used to voice render the synthesized data.

Figure 14D:
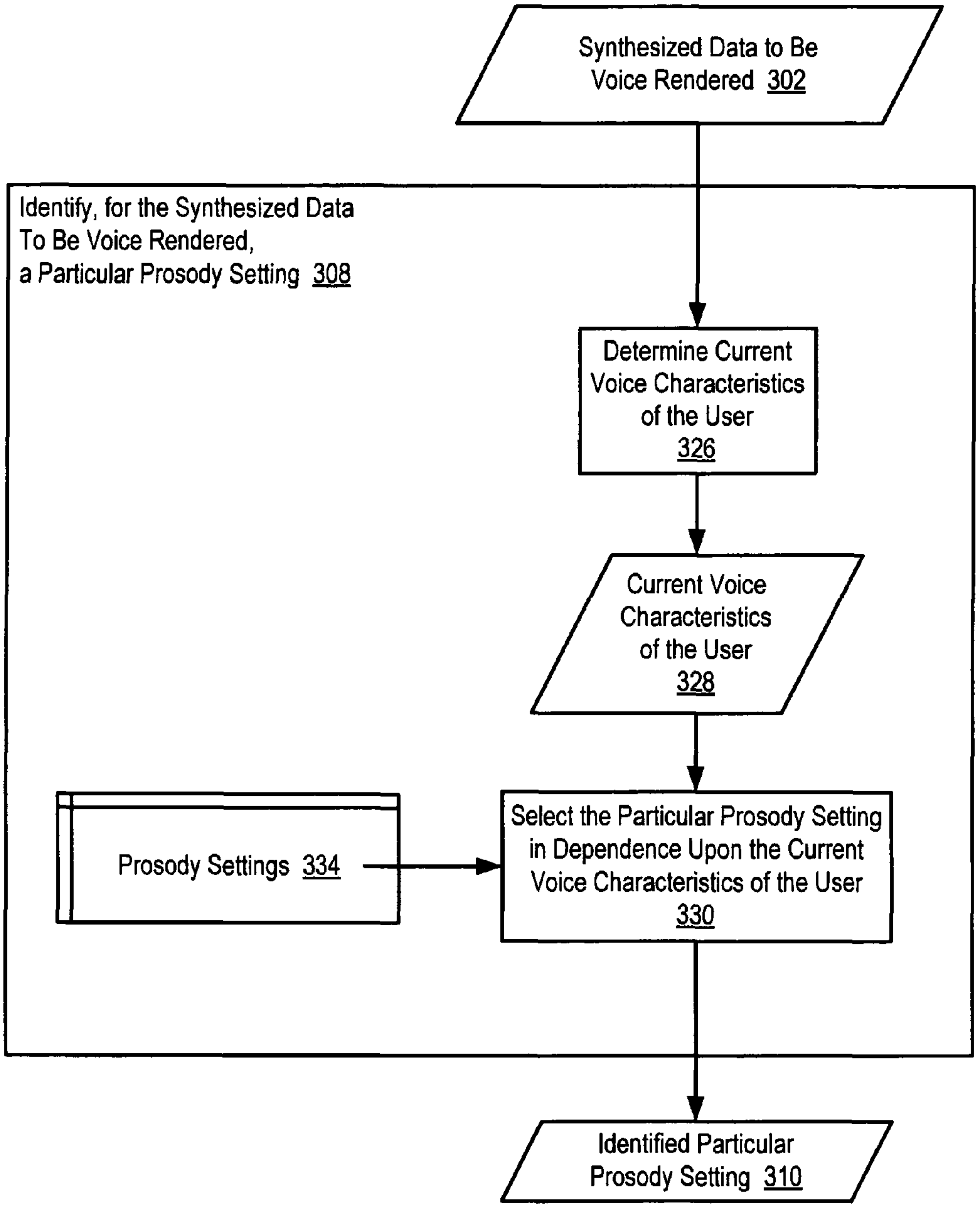
FIG. 14D sets forth a flow chart illustrating an alternative exemplary method for identifying a particular prosody setting according to embodiments of the present invention.

Turning now to FIG. 14D, FIG. 14D sets forth a flow chart illustrating another exemplary method for identifying (308) a particular prosody setting for voice rendering the synthesized data. In the method of FIG. 14D, identifying (308) a particular prosody setting also includes determining (326) current voice characteristics of the user (328) and selecting (330) the particular prosody setting (310) in dependence upon the current voice characteristics of the user (328). Voice characteristics of the user include variations of stress of syllables, intonation, timing in spoken language, variations in pitch from word to word, the rate of speech, the loudness of speech, the duration of pauses, and other distinctive speech characteristics as will occur to those of skill in the art.

Determining (326) current voice characteristics of the user (328) may be carried out by receiving speech from the user and comparing individual characteristics of speech with predetermined voice-pattern profiles having associated prosody settings. A voice-pattern profile is a collection of individual aspects of voice characteristics such as rate, emphasis, volume, and so on which are transformed into value ranges. Such a voice-pattern profile also has associated prosody settings for the voice profile.

If the current voice characteristics of the user (328) fall within the individual ranges of a voice-pattern profile, the current voice characteristics are determined to match the voice-pattern profile. Prosody settings associated with the voice-pattern profile are then selected for voice rendering the section of synthesized data.

Selecting (330) the particular prosody setting (310) in dependence upon the current voice characteristics of the user (328) may also be carried out without voice-pattern profiles by determining individual aspects of the voice characteristics, such as, for example, rate of speech, and selecting individual particular prosody settings that most closely match each corresponding aspect of the voice characteristics of the user. In other words, the particular prosody settings are selected to most closely match the speech of the user.

As discussed above, voice-rendering synthesized data according to the present invention also includes determining a section of the synthesized data to be rendered. A section of synthesized data is any fraction or sub-element of synthesized data up to and including the whole of the synthesized data. The section of the synthesized data to be rendered is not required to be a contiguous section of synthesized data. The section of the synthesized data to be rendered may include non-adjacent snippets of the synthesized data. Determining a section of the synthesized data to be rendered is typically carried out in dependence upon the synthesized data to be rendered and context information describing the context in which synthesized data is to be voice rendered.

For further explanation, FIG. 15 sets forth a flow chart illustrating an exemplary method for determining (312), in dependence upon the synthesized data to be voice rendered (302) and the context information (306) for the context in which the synthesized data is to be voice rendered, a section of the synthesized data to be rendered (314). The method of FIG. 15 includes determining (350) the context information (306) for the context in which the synthesized data is to be voice rendered. Determining (350) the context information (306) for the context in which the synthesized data is to be voice rendered may be carried out by receiving context information (306) from other processes running on a device, from hardware, or from any other source of context information (306) as will occur to those of skill in the art.

Determining (312) a section of the synthesized data to be rendered (314), according to the method of FIG. 15, also includes identifying (354) in dependence upon the context information (306) a section length (362). Section length, is typically implemented as a quantity of the synthesized content (364), such as, for example, a particular number of bytes of the synthesized data, a particular number of lines of text, particular number of paragraphs of text, particular number of chapters of content, or any other quantity of the synthesized content (364) as will occur to those of skill in the art.

Identifying (354) in dependence upon the context information (306) a section length (362) may be carried out by performing a lookup in a section length table including predetermined section lengths indexed by context and often the native data type of the synthesized data to be rendered. Consider for further explanation the example of a user speaking the words 'read email' when the user's laptop is closed at 8:00 am when the user is typically driving to work. Identifying a section length may be carried out by performing a lookup in a context information table to select a context ID for reading synthesized email at 8:00 am. The selected context ID has a predetermined section length of five lines for synthesized email.

Identifying (354), in dependence upon the context information (306), a section length (362) may be carried out by identifying (356) in dependence upon the context information (306) a rendering time (358); and determining (360) a section length (362) to be rendered in dependence upon the prosody settings (334) and the rendering time (358). A rendering time is a value indicating the time allotted for rendering a section of synthesized data. Rendering times together with prosody settings determine the quantity of content that can be voice rendered. For example, prosody settings for slower speech rate require longer rendering times to voice render the same quantity of content that do prosody settings for rapid speech.

Identifying (356) in dependence upon the context information (306) a rendering time (358) may be carried out by performing a lookup in a rendering time table. Each entry in such a rendering time table has a rendering time indexed by the prosody settings, context information, and often the native data type of the synthesized data.

Consider for further illustration the exemplary rendering time table information contained in a single entry in the rendering time table:

```
Prosody_Settings; rate=slow;
Context_Information; laptop closed
Native_Data_Type; email
Rendering_Time; 30 seconds
```

In the exemplary rendering time table entry information above, a rendering time of 30 seconds is predetermined for rendering a section of synthesized data when the prosody setting for data to be rendered is a slow rate of speech, the laptop is closed, and the native data type of the synthesized data to be rendered is email.

Determining (312), according to the method of FIG. 15, a section of the synthesized data to be rendered (314) also includes selecting (366) a section of the synthesized data to be rendered (302) in dependence upon the identified section length (362). The section so selected is a section having the identified section length. As mentioned above, the section is not required to be a contiguous section length of synthesized data. The section of the synthesized data to be rendered may include non-adjacent snippets of the synthesized data that together form a section of the identified section length.

Selecting (366) a section of the synthesized data to be rendered (302) in dependence upon the identified section length (362) may be carried out by applying section-selection rules to the synthesized data. Section-selection rules are rules governing the selection of synthesized data to form a section of the synthesized data for voice rendering.

Consider for further illustration the example section-selection rules below:

```
IF Native Data Type of Synthesized data = email
    AND Section length = 5 lines
        Select FROM: line
        Select First 4 lines of content
```

In the exemplary section-selection rules above, if the native data type of the synthesized data is email and the section length is five lines, then the section of the synthesized data to be rendered includes the 'From:' line of the synthesized email and the first four lines of content of the synthesized email.

Exemplary embodiments of the present invention are described largely in the context information of a fully functional computer system for managing and rendering data for disparate data types. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for voice-rendering synthesized data comprising:

receiving speech from a user including a user instruction associated with a task;

retrieving synthesized data to be voice rendered for responding to said user instruction;

identifying, for the synthesized data to be voice rendered, a particular prosody setting including determining current voice characteristics of the user from said user instruction and selecting the particular prosody setting in dependence upon the current voice characteristics of the user;

retrieving context information including historical context data associated with historical user prosody settings;

determining, in dependence upon the synthesized data to be voice rendered and the context information for the context in which the synthesized data is to be voice rendered, a section of the synthesized data to be rendered including determining the context information for the context in which the synthesized data is to be voice rendered, identifying in dependence upon the context information a section length, and selecting a section of the synthesized data to be rendered in dependence upon the identified section length;

wherein identifying in dependence upon the context information a section length further comprises:

identifying in dependence upon the context information a rendering time; and determining a section length to be rendered in dependence upon the prosody settings and the rendering time;

rendering the section of the synthesized data in dependence upon the identified particular prosody setting to provide a response to said user instruction.

2. The method of claim 1, further comprising:

retrieving a user prosody history for said user, wherein the identifying of the particular prosody setting comprises selecting the particular prosody setting in dependence upon the user prosody history and the current voice characteristics.

3. The method of claim 2, wherein the user prosody history includes the historical context data associated with the historical user prosody settings, said historical context data including time of day, day of week and native data type for data being rendered.

4. The method of claim 3, further comprising:

defining a default prosody setting based on prosody history for the user, wherein the default prosody setting may be selected as the particular prosody setting if no historical context data matches the current voice characteristics.

5. The method of claim 1, wherein the synthesized data comprises aggregated data of at least two disparate data types synthesized into a uniform data type; and wherein the speech from the user is received on a device capable of rendering said uniform data type.

6. The method of claim 5, wherein the uniform data type is XHTML plus Voice; and wherein the retrieving of the synthesized data is performed in response to receiving the speech from the user.

7. The method of claim 1, wherein the task involves a manner of processing the synthesized data.

8. A system for voice-rendering synthesized data comprising a computer processor, a computer memory operatively coupled to the computer processor, the computer memory having disposed within it computer program instructions capable of:

receiving speech from a user including a user instruction associated with a task;

retrieving synthesized data to be voice rendered for responding to said user instruction;

identifying, for the synthesized data to be voice rendered, a particular prosody setting including determining current voice characteristics of the user from said user instruction and selecting the particular prosody setting in dependence upon the current voice characteristics of the user;

retrieving context information including historical context data associated with historical user prosody settings;

determining, in dependence upon the synthesized data to be voice rendered and the context information for the context in which the synthesized data is to be voice rendered, a section of the synthesized data to be rendered including determining the context information for the context in which the synthesized data is to be voice rendered, identifying in dependence upon the context information a section length, and selecting a section of the synthesized data to be rendered in dependence upon the identified section length;

wherein identifying in dependence upon the context information a section length further comprises:

identifying in dependence upon the context information a rendering time; and determining a section length to be rendered in dependence upon the prosody settings and the rendering time;

rendering the section of the synthesized data in dependence upon the identified particular prosody setting to provide a response to said user instruction.

9. The system of claim 8, further comprising computer program instructions capable of:

retrieving a user prosody history for said user, wherein the identifying of the particular prosody setting comprises selecting the particular prosody setting in dependence upon the user prosody history and the current voice characteristics.

10. The system of claim 9, wherein the user prosody history includes the historical context data associated with the historical user prosody settings, said historical context data including time of day, day of week and native data type for data being rendered.

11. The system of claim 10, further comprising computer program instructions capable of:

defining a default prosody setting based on prosody history for the user, wherein the default prosody setting may be selected as the particular prosody setting if no historical context data matches the current voice characteristics.

12. The system of claim 8, wherein the synthesized data comprises aggregated data of at least two disparate data types synthesized into a uniform data type; and wherein the speech from the user is received on a device capable of rendering said uniform data type.

13. The system of claim 12, wherein the uniform data type is XHTML plus Voice; and wherein the retrieving of the synthesized data is performed in response to receiving the speech from the user.

14. The system of claim 8, wherein the task involves a manner of processing the synthesized data.

15. A computer program product for voice-rendering synthesized data, the computer program product disposed on a computer readable recording medium, the computer program product comprising computer program instructions capable of:

receiving speech from a user including a user instruction associated with a task;

retrieving synthesized data to be voice rendered for responding to said user instruction;

identifying, for the synthesized data to be voice rendered, a particular prosody setting including determining current voice characteristics of the user from said user instruction and selecting the particular prosody setting in dependence upon the current voice characteristics of the user;

retrieving context information including historical context data associated with historical user prosody settings;

determining, in dependence upon the synthesized data to be voice rendered and the context information for the context in which the synthesized data is to be voice rendered, a section of the synthesized data to be rendered including determining the context information for the context in which the synthesized data is to be voice rendered, identifying in dependence upon the context information a section length, and selecting a section of the synthesized data to be rendered in dependence upon the identified section length;

wherein identifying in dependence upon the context information a section length further comprises:

identifying in dependence upon the context information a rendering time; and determining a section length to be rendered in dependence upon the prosody settings and the rendering time;

rendering the section of the synthesized data in dependence upon the identified particular prosody setting to provide a response to said user instruction.

16. The computer program product of claim 15, further comprising computer program instructions capable of:

retrieving a user prosody history for said user, wherein the identifying of the particular prosody setting comprises selecting the particular prosody setting in dependence upon the user prosody history and the current voice characteristics.

17. The computer program product of claim 16, wherein the user prosody history includes the historical context data associated with the historical user prosody settings, said historical context data including time of day, day of week and native data type for data being rendered.

18. The computer program product of claim 17, further comprising computer program instructions capable of:

defining a default prosody setting based on prosody history for the user, wherein the default prosody setting may be selected as the particular prosody setting if no historical context data matches the current voice characteristics.

19. The computer program product of claim 15, wherein the synthesized data comprises aggregated data of at least two disparate data types synthesized into a uniform data type; and wherein the speech from the user is received on a device capable of rendering said uniform data type.

20. The computer program product of claim 19, wherein the uniform data type is XHTML plus Voice; and wherein the retrieving of the synthesized data is performed in response to receiving the speech from the user.

21. The computer program product of claim 15, wherein the task involves a manner of processing the synthesized data.

* * * * *